US012786744B2

(12) United States Patent
Mada et al.

(10) Patent No.: US 12,786,744 B2
(45) Date of Patent: Nov. 3, 2026

(54) PATTERN DETECTION IN A CELLULAR TELECOMMUNICATION NETWORK

(71) Applicant: Boost SubscriberCo L.L.C., Englewood, CO (US)

(72) Inventors: Praveen Mada, Denver, CO (US); Vinayak Sharma, Denver, CO (US); Hamza Khokhar, Aurora, CO (US); Aakash Agrawal, Englewood, CO (US); David Matthew Cherney, Highlands Ranch, CO (US); Evgeniya Dontsova, Englewood, CO (US); Madhu Bandi, Englewood, CO (US); Lauren Mieczkowski, Englewood, CO (US); Matthew James Reed, Centennial, CO (US); Ruyi Yang, Dallas, TX (US)

(73) Assignee: Boost SubscriberCo L.L.C., Englewood, CO (US)

( * ) Notice: Subject to any disclaimer, the term of this patent is extended or adjusted under 35 U.S.C. 154(b) by 338 days.

(21) Appl. No.: 18/418,011

(22) Filed: Jan. 19, 2024

(65) Prior Publication Data

US 2025/0240645 A1 Jul. 24, 2025

(51) Int. Cl.

| | |
|---|---|
| ***H04W 24/02*** | (2009.01) |
| ***H04L 41/0823*** | (2022.01) |
| ***H04L 41/16*** | (2022.01) |
| ***H04L 43/04*** | (2022.01) |
| ***H04W 24/08*** | (2009.01) |

(52) U.S. Cl.

CPC ......... *H04W 24/02* (2013.01); *H04L 41/0823* (2013.01); *H04L 41/16* (2013.01); *H04L 43/04* (2013.01); *H04W 24/08* (2013.01)

(58) Field of Classification Search

CPC ..... H04W 24/02; H04W 24/08; H04W 24/04; H04L 41/0823; H04L 41/16; H04L 43/04; H04L 41/145; H04L 41/147; H04L 41/149; H04L 41/40; H04L 41/5009

See application file for complete search history.

(56) References Cited

U.S. PATENT DOCUMENTS

| | | | | |
|---|---|---|---|---|
| 2020/0053155 | A1* | 2/2020 | Shi | H04L 41/16 |
| 2024/0406058 | A1* | 12/2024 | Alon | H04L 43/06 |
| 2025/0023779 | A1* | 1/2025 | Sumedrea | H04L 41/0894 |
| 2025/0056263 | A1* | 2/2025 | Chenumolu | H04W 76/25 |
| 2025/0280305 | A1* | 9/2025 | Yip | G06N 3/063 |

* cited by examiner

*Primary Examiner* — Kan Yuen

(74) *Attorney, Agent, or Firm* — Kipman T. Werking; Frontier IP Law PLLC

(57) ABSTRACT

A disclosed method may include (i) predicting a network deficiency by applying a machine learning model trained on a log from a monitoring tool that monitors a resource within a cloud computing platform on which is executing at least part of a cellular telecommunication network core that is configured within a managed container-orchestration system as specified by a file chart generated by a cloud native computing package manager and (ii) modifying how the cellular telecommunication network core is configured within the managed container-orchestration system such that the predicted network deficiency is at least partially prevented by modifying the file chart according to a recommendation of the machine learning model and deploying the modified file chart.

20 Claims, 25 Drawing Sheets

PATTERN DETECTION IN A CELLULAR TELECOMMUNICATION NETWORK

BRIEF SUMMARY

This disclosure is generally directed to systems, methods, and computer-readable media relating to pattern detection in the context of a cellular telecommunication network core implemented within a cloud computing platform. This technology may address a number of problems or deficiencies that can arise within that context. For example, the technology can reveal insights from machine learning that would otherwise be unavailable to the carrier or administrator associated with the cellular telecommunication network core. Similarly, the technology can automate or streamline activities in a manner that reduces or eliminates human interactivity and corresponding human error, as discussed further below. Other potential advantages of various embodiments of the technology are also discussed throughout this disclosure.

In some examples, the systems of this disclosure may equip a cellular telecommunication carrier implemented on a cloud computing platform with tools to build a real-time self-perfecting or self-improving network, including a fifth-generation and beyond cellular network. One mechanism for doing so may include modeling inferences associated with a managed container-orchestration system. Another mechanism to do so may include disposing one or more models in a plurality, majority, substantial or predominant majority, or in an entirety, of managed container-orchestration system clusters on which is executing the cellular telecommunication network core. An additional mechanism may include deploying a software development kit that enables one to execute an open network pattern reactor while interfacing, in a plug-and-play manner, with a variety of different brands of input and output components. Implementing the above functionality may enable the system to perform operations that include understanding patterns within the cellular telecommunication network core and/or implementing self-perfecting or self-improving techniques as a layer inside of the cellular telecommunication network core, as discussed in more detail below.

In one example, a method may include (i) predicting a network deficiency by applying a machine learning model trained on a log from a monitoring tool that monitors a resource within a cloud computing platform on which is executing at least part of a cellular telecommunication network core that is configured within a managed container-orchestration system as specified by a file chart generated by a cloud native computing package manager and (ii) modifying how the cellular telecommunication network core is configured within the managed container-orchestration system such that the predicted network deficiency is at least partially prevented by modifying the file chart according to a recommendation of the machine learning model and deploying the modified file chart. In further examples, the machine learning model is configured to predict, as output, a future state of the cellular telecommunication network core based on a candidate modification to the cellular telecommunication network core as input.

In some examples, the machine learning model is generated by labeling the log from the monitoring tool with a containerized network function of the cellular telecommunication network that is executing on the resource within the cloud computing platform and training the machine learning model on the log labeled with the containerized network function.

In some examples, the machine learning model generates the recommendation by generating, as outputs, a set of multiple predicted states of the cellular telecommunication network core based on, as inputs, a set of respective candidate modifications to the cellular telecommunication network core and selecting, as the recommendation, a specific candidate modification from the respective candidate modifications that maximizes a function that is directed to maximizing price performance in terms of satisfying a service level agreement between a carrier of the cellular telecommunication network core and an end-user.

In some examples, the candidate modification to the cellular telecommunication network core comprises at least one of: a null action of maintaining a current condition of the cellular telecommunication network core, elastically sizing up or down an instance or a number of instances of the resource in the cloud computing platform, relocating a containerized network function toward or away from an edge of the cloud computing platform, switching a version of the containerized network function, or switching a source or brand of the containerized network function.

In some examples, modifying the file chart generated by the cloud native computing package manager and deploying the modified file chart is performed by the cellular telecommunication network core such that the cellular telecommunication network core is autonomously self-improving.

In some examples, the machine learning model comprises a deep neural network that recommends cellular telecommunication network core modifications to be performed through the managed container-orchestration system. In further examples, the method inputting, into the deep neural network, a root cause extracted through a root cause analysis.

In some examples, the method includes outputting, by the deep neural network, a specific cellular telecommunication network modification that at least partially prevents the predicted network deficiency by performing a modification to the file chart generated by the cloud native computing package manager and deploying the modified file chart.

In some examples, the method includes evaluating a result of the modification to the file chart generated by the cloud native computing package manager in comparison to a service level agreement between an operator of the cellular telecommunication network core and a user of the cellular telecommunication network.

In some examples, the method comprises penalizing or rewarding, within the deep neural network, the modification to the file chart generated by the cloud native computing package manager.

In some examples, penalizing or rewarding, within the deep neural network, the modification to the file chart generated by the cloud native computing package manager is performed by the cellular telecommunication network core such that the cellular telecommunication network core is autonomously self-improving.

In some examples, the deep neural network is configured such that the deep neural network labels states of the cellular telecommunication network core with recommended cellular telecommunication network core modifications.

In some examples, the deep neural network comprises a deep q-network or a bidirectional long short-term memory autoencoder.

In some examples, a respective instance of the deep neural network is disposed in a majority of each cluster of the managed container-orchestration system on which the cellular telecommunication network core operates.

In some examples, the method is performed by a data dependent application and the data dependent application inputs data from a network stack across a distributed event store and stream processing platform within a data center.

In some examples, the distributed event store and stream processing platform inputs data from at least three of the following components of the network stack: a radio access network core probe for cloud-native automated service assurance component, a radio access network core observability framework component, a cloud computing services operations component, and a virtualization operations component.

In some examples, a corresponding system includes at least one physical computing processor of a computing system and a non-transitory computer-readable medium encoding instructions that, when executed by the at least one physical computing processor, cause the computing system to perform operations including: (i) predicting a network deficiency by applying a machine learning model trained on a log from a monitoring tool that monitors a resource within a cloud computing platform on which is executing at least part of a cellular telecommunication network core that is configured within a managed container-orchestration system as specified by a file chart generated by a cloud native computing package manager and (ii) modifying how the cellular telecommunication network core is configured within the managed container-orchestration system such that the predicted network deficiency is at least partially prevented by modifying the file chart according to a recommendation of the machine learning model and deploying the modified file chart. In further examples, the machine learning model is configured to predict, as output, a future state of the cellular telecommunication network core based on a candidate modification to the cellular telecommunication network core as input.

In some examples, a method includes providing a software development kit, wherein the software development kit is configured such that the software development kit generates software that performs operations including: (i) predicting a network deficiency by applying a machine learning model trained on a log from a monitoring tool that monitors a resource within a cloud computing platform on which is executing at least part of a cellular telecommunication network core that is configured within a managed container-orchestration system as specified by a file chart generated by a cloud native computing package manager and (ii) modifying how the cellular telecommunication network core is configured within the managed container-orchestration system such that the predicted network deficiency is at least partially prevented by modifying the file chart according to a recommendation of the machine learning model and deploying the modified file chart. In further examples, the machine learning model is configured to predict, as output, a future state of the cellular telecommunication network core based on a candidate modification to the cellular telecommunication network core as input.

In some examples, the software development kit comprises a plug-and-play component that interfaces with the cloud native computing package manager in a manner that is agnostic between different brands of cloud native computing package manager.

In some examples, the software development kit is configured such that deploying the modified file chart is performed through a managed container-orchestration system facilitator application and the software development kit comprises a plug-and-play component that interfaces with the managed container-orchestration system facilitator application in a manner that is agnostic between different brands of managed container-orchestration system deployment facilitator applications.

In some examples, the software development kit comprises a plug-and-play component that interfaces with the managed container-orchestration system in a manner that is agnostic between different brands of managed container-orchestration systems.

BRIEF DESCRIPTION OF THE DRAWINGS

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
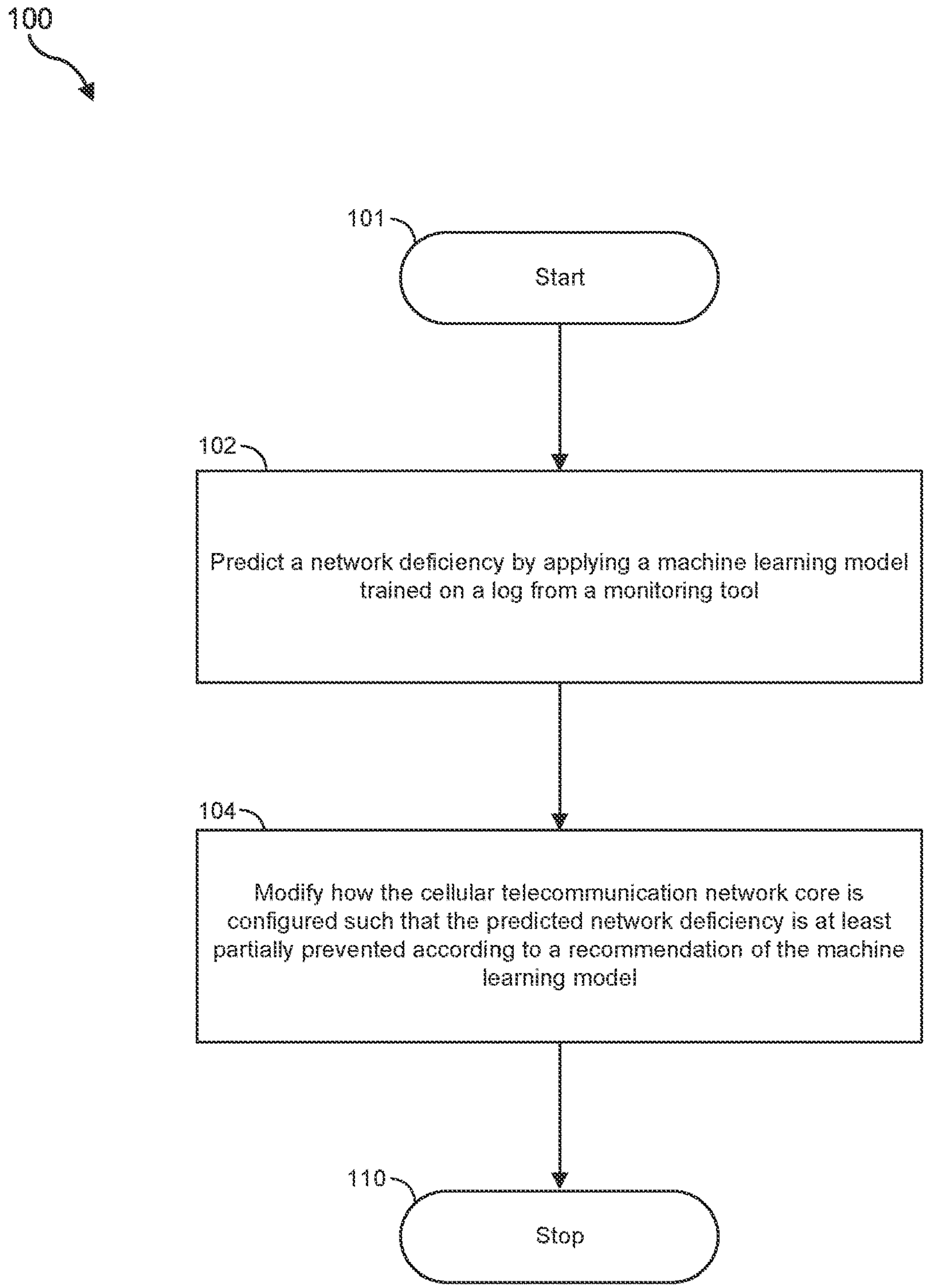
FIG. 1 shows a flow diagram for a method relating to pattern detection in the context of a cellular telecommunication network core operating in a cloud computing platform.

FIG. 1 shows a flow diagram for an example method 100 relating to pattern detection within a cellular telecommunication network core implemented within a cloud computing platform. At step 102, method 100 may include predicting a network deficiency by applying a machine learning model trained on a log from a monitoring tool that monitors a resource within a cloud computing platform on which is executing at least part of a cellular telecommunication network core that is configured within a managed container-orchestration system as specified by a file chart generated by a cloud native computing package manager. At step 104, method 100 may include modifying how the cellular telecommunication network core is configured within the managed container-orchestration system such that the predicted network deficiency is at least partially prevented by modifying the file chart according to a recommendation of the machine learning model and deploying the modified file chart. In some examples, the machine learning model is configured to predict, as output, a future state of the cellular telecommunication network core based on a candidate modification to the cellular telecommunication network core as input. In further examples, the machine learning model is generated by (i) labeling the log from the monitoring tool with a containerized network function of the cellular telecommunication network that is executing on the resource within the cloud computing platform and (ii) training the machine learning model on the log labeled with the containerized network function. At step 110, method 100 may stop or conclude. As used herein, a "file chart" can refer to a collection of interrelated or packaged files, consistent with the discussion below. In some examples, the file chart can include or correspond to a HELM chart. In some examples, each file in the file chart can describe a separate Kubernetes or other resources, which can each refer to or define a node, a pod, a container, and/or a containerized network function on the telecommunication network core, etc.

In general, the machine learning model can correlate specific actions performed by containerized network functions of the cellular telecommunication network core with effects within the cellular telecommunication network core that predictably result from performing the specific actions. For example, the machine learning model can correlate, as inputs, the action of one or more containerized network functions with one or more effects or results of such actions, in terms of output. The inputs can include toggling on or off a containerized network function and/or modifying or adjusting one or more features or attributes related to functioning of the containerized network function. Illustrative examples of effects or results from these inputs may include increasing or decreasing (i.e., sizing) demand for containerized network function instances, clusters, computational power or resources, memory, network bandwidth or other network resources, etc., and/or increasing or decreasing one or more of these resources in response to such demand. Additional illustrative examples of selective, responsive, or compensatory actions that the machine learning model can recommend include placing, inserting, deploying, locating, and/or relocating one or more containerized network functions to a particular location, such as a particular compute region and/or a particular data center. For example, certain low latency applications may benefit from certain resources being deployed closer to the edge of the network and/or may benefit from moving other resources, such as containerized network functions, to a centralized component of the cloud computing platform. Similarly, the recommended actions may include selecting, specifying, and/or altering the versioning of a containerized network function and/or selecting, specifying, and/or altering the branding, source, and/or original manufacturer or developer of a containerized network function. One or more of these actions may be recommended or performed based on a determination or calculated decision that the action would optimize satisfaction of a service level agreement or otherwise be optimally suited for the use case that a particular end-user or customer specifies or indicates.

As used herein, the term "managed container-orchestration system" can generally refer to a system for managing, orchestrating, and/or automating operating system level virtualization. Such systems may involve the kernel allowing the existence of multiple isolated user space instances, which can be referred to as containers, zones, virtual private servers, partitions, virtual environments, virtual kernels, or jails. In some examples, the managed orchestration system can be open source. In one illustrative example of the managed container-orchestration system, the system includes Kubernetes and/or a cloud computing platform implementation of Kubernetes, such as Elastic Kubernetes Service. As used herein, the term "cloud native computing package manager" can generally refer to a software application that manages the creation, maintenance, handling, and/or deployment of software packages and/or file charts for deployment on a cloud computing platform. An illustrative example of the cloud native computing package manager can include HELM.

Figure 2:
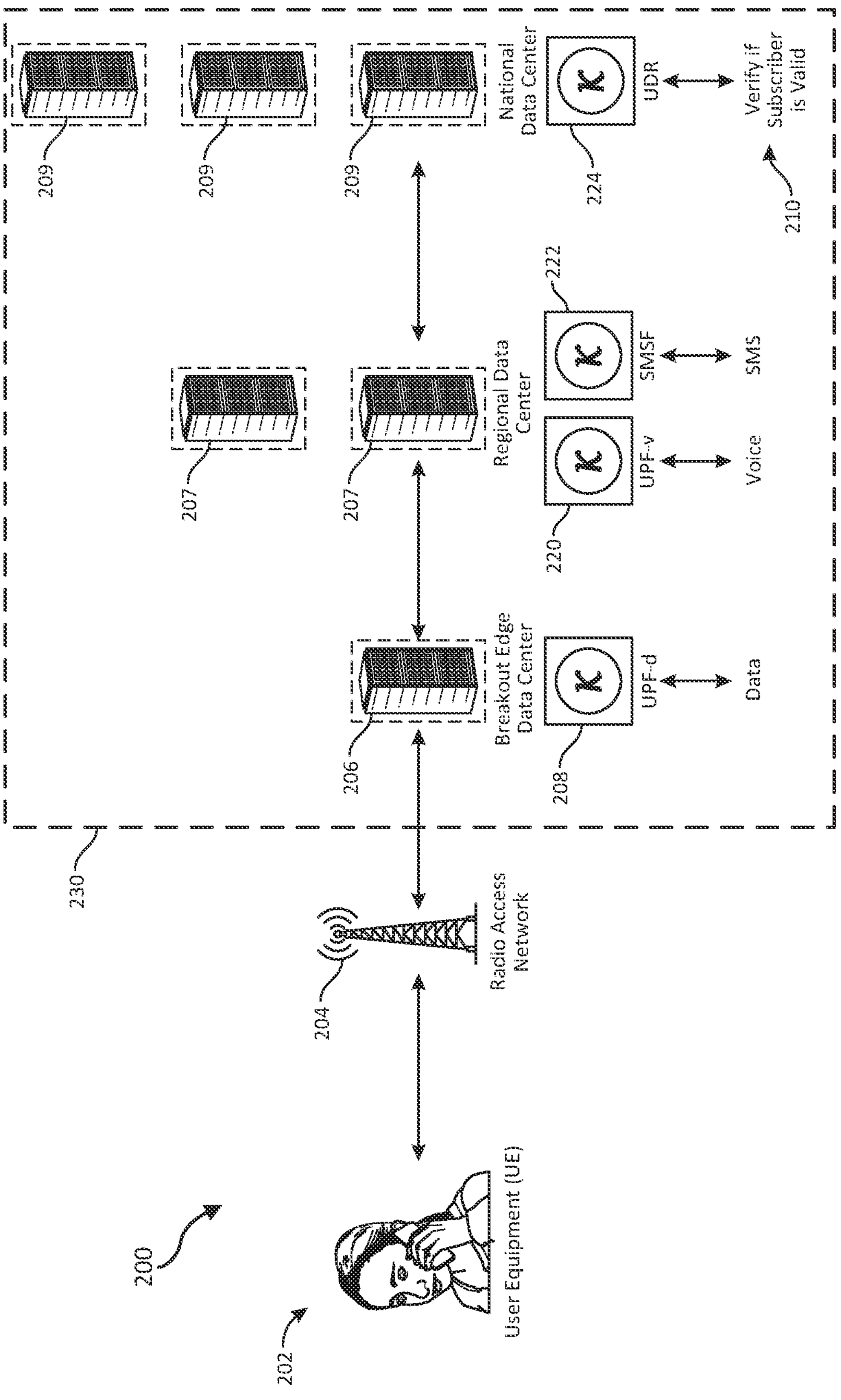
FIG. 2 shows a diagram of a cellular telecommunication network including relationships between user equipment, a radio access network, data centers, and network functions.

FIG. 2 shows a diagram 200 of a cellular telecommunication network including relationships between user equipment, a radio access network, data centers, and network functions. In this particular example, diagram 200 may correspond to a high-level perspective or overview of a fifth-generation cellular telecommunication network. User equipment 202 may correspond to a smartphone, laptop, and/or Internet-of-Things device, etc. Various items of user equipment 202 may interface with one or more instances of data centers, including a breakout edge data center 206, a regional data center 207, and/or a national data center 209. The instances of breakout edge data center 206, regional data center 207, and/or national data center 209 can collectively form a cellular telecommunication network core 230, as shown. One or more instances of breakout edge data center 206 may be disposed geographically closer to radio access network 204 and corresponding antennas, which can facilitate higher speeds and/or responsiveness in terms of providing cellular services to end-users. User equipment 202 may communicate with a radio access network 204 corresponding to one or more antennas, as shown within diagram 200. In some examples, cellular telecommunication network core 230 (as distinct from user equipment 202 or radio access network 204) may correspond to one or more locations where embodiments of the open network pattern reactor and/or other inventive solutions of this application are disposed or focused.

In example embodiments, one or more of the data centers shown within diagram 200 may provide a cloud computing platform on which is implemented a cellular telecommunication network core that, when configured in coordination with radio access network 204 and user equipment 202, provides cellular service to an end-user of user equipment 202. In particular, the cellular telecommunication network may include a cloud-native open radio access network providing fifth-generation and beyond cellular services through virtualization, in which hardware and/or infrastructure components are implemented as software components (e.g., containerized software components or network functions) within a cloud computing platform, such as an on-demand public cloud computing platform, for example.

In the example of diagram 200, breakout edge data center 206 may provide a managed container-orchestration system (e.g., Elastic Kubernetes Service) cluster 208 on which executes a containerized network function as part of the fifth-generation cellular telecommunication network. In this particular example, the network function at cluster 208 may include a user plane function directed to data services, such as cellular Internet data services.

In contrast, the instances of regional data center 207 may execute one or more instances of a cluster 220 and/or a cluster 222, which execute respective containerized network functions. In particular, cluster 220 may execute a user plane function directed to voice (e.g., telephone calls over the 5G network) and/or cluster 222 may execute a short message service function ("SMSF") directed to short message service or text messaging functioning. As another example, the instances of national data center 209 may operate a managed container-orchestration system cluster 224, which may execute a containerized network function in terms of a unified data repository or database that stores subscription-related data. Indicator 210 further indicates to the reader that cluster 224, when executing the unified data repository, helps to verify whether a subscriber is valid and, therefore, whether the subscriber has permission to receive cellular service. Although the example of this figure is described in terms of a fifth-generation cellular telecommunication network, those having skill in the art will readily ascertain that the various embodiments and inventive concepts described herein are equally applicable to earlier and later generation cellular telecommunication networks, in a substantially parallel manner, when those networks are virtualized for operation on a cloud computing platform, as discussed above and in more detail further below.

Generally speaking, embodiments of one or more inventive solutions described herein may focus upon infrastructure-defining data, which may be specified in files such as YAML and/or JSON files, and the correlation of this infrastructure-defining data with network function application data to thereby provide an understanding of network behavior. In particular, correlating the infrastructure-defining data with network function application data may provide insights regarding what kind of requests the network is processing at a particular point in time, as well as insights regarding how the overall infrastructure is behaving. These correlations may be extracted or identified using machine learning methodologies, as discussed further below, thereby creating a corresponding predictive machine learning model. In some examples, these correlations may be agnostic regarding the particular processing that is occurring on the network functions, while nevertheless the correlations may provide insights regarding how the infrastructure is behaving under multiple different variations of loads. The predictive machine learning model may also further provide insights or predictions regarding how particular network function actions may trigger corresponding failures within the cellular telecommunication network. Generally speaking, these predictions may be valuable at least to the extent that the predictions provide warnings regarding failures before the failures actually occur, thereby enabling administrators or the network itself (see the discussing of self-improving networks with respect to FIGS. 4A-6 below) to take appropriate remedial actions and prevent the predicted failures.

The above methodology is particularly well-suited to an environment, such as the environment depicted in FIG. 2, where the entire cellular telecommunication core is implemented on a cloud computing platform, such as an on-demand public cloud computing platform. In other words, the fact that the entirety of the cellular telecommunication network core is implemented on the cloud computing platform results in both quantitative and qualitative improvements in terms of observability metrics regarding the state and performance of the network. The fact that the cellular telecommunication network core is implemented on the cloud computing platform provides greater insights and visibility in terms of CPU utilization and/or memory utilization for each cluster and/or for each network transaction happening on the network.

More specifically, in some embodiments, the feature enabling the quantitative and qualitative improvements in terms of observability metrics includes a platform-specific tool that the cloud computing platform provides for monitoring its services. The tool may be platform-specific in the sense that it is provided by the cloud computing platform rather than the cellular telecommunication network core provider (e.g., in scenarios where these two entities are independent and distinct). In the example of Amazon Web services, the platform-specific tools may include CloudWatch logs, although the various technologies disclosed in this application are not limited to that particular brand or implementation. Platform-specific tools may provide quantitative and qualitative improvements in terms of observability, in comparison to traditional (off-cloud) cellular telecommunication network infrastructures, for at least two separate reasons. First, the use of virtualization provides bit-by-bit perfect measurement information which is not otherwise available or practical in the context of off-cloud or analog cellular telecommunication network infrastructures. Second, the use of platform-specific measurement tools benefits from the greater understanding, visibility into, and/or access to the cloud computing platform, its resources, and/or its underlying physical infrastructure than that possessed by the cellular telecommunication network carrier leveraging such a cloud computing platform for provisioning of a fifth-generation network. Accordingly, there may be no individuals within a traditional off-cloud cellular telecommunication network carrier who would have such a meaningful and comprehensive understanding of the network's behavior. The platform-specific measurement tools provide greater versatility and provide more granular inputs and outputs than traditional measurement tools associated with off-cloud infrastructures. These more granular inputs and outputs can provide higher resolution data along various axes or spectrums, such as time, than the traditional measurement tools associated with off-cloud infrastructures.

Figure 3A:
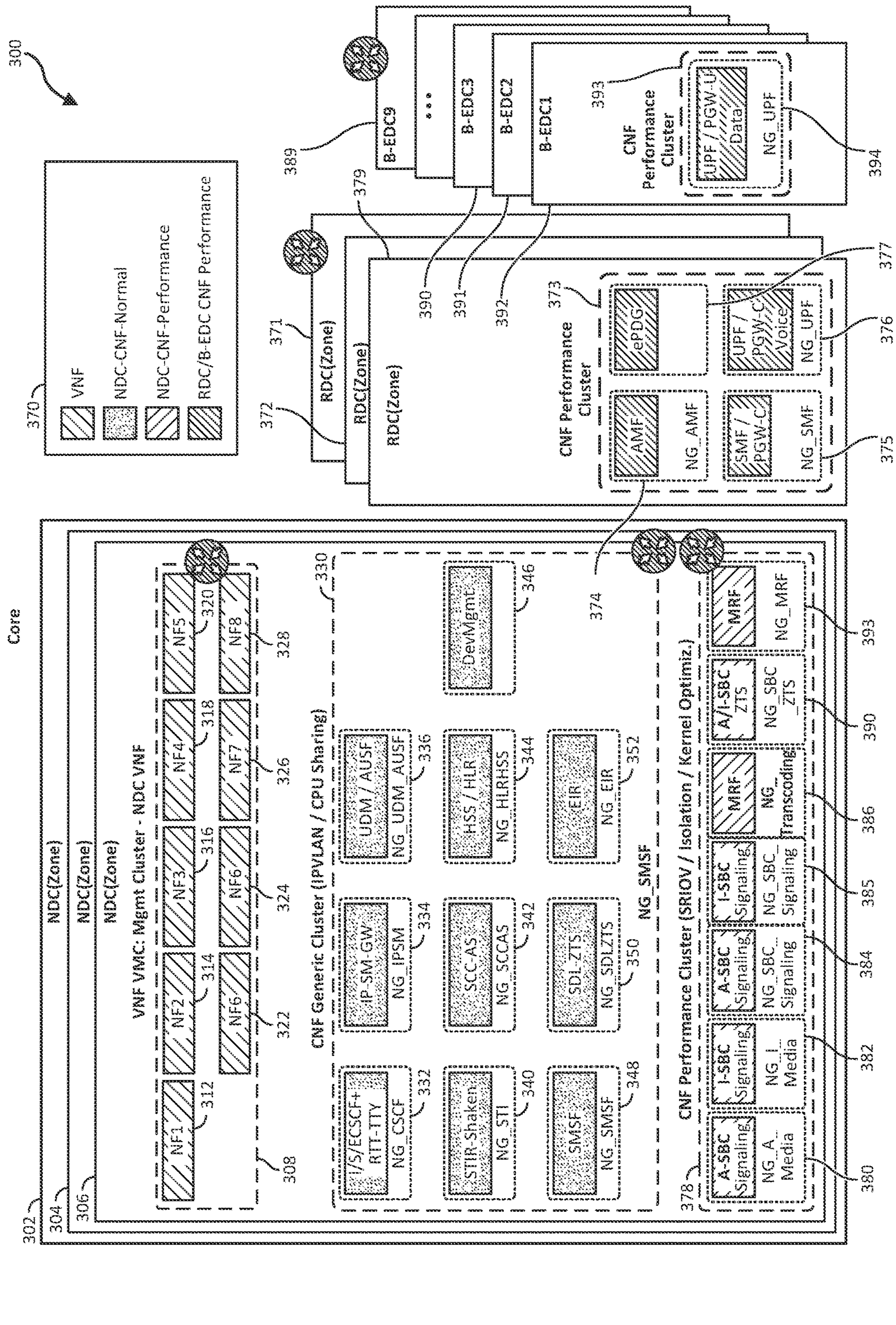
FIG. 3A shows a more detailed diagram of internal components within corresponding data centers of the cellular telecommunication network.

FIG. 3 shows a more detailed diagram 300 of internal components within corresponding data centers of the cellular telecommunication network. In other words, diagram 300 may provide more detail regarding a cellular telecommunication network core, which can correspond to cellular telecommunication network core 230, and which is implemented on a cloud computing platform. Diagram 300 illustrates how different network functions may be executing within a national data center and corresponding availability zone 306. Similarly, other network functions may be executing within a regional data center and availability zone 379. Moreover, another network function may be excusing within a breakout edge data center 392, as shown. Diagram 300 also illustrates how other data centers may be configured in an essentially parallel manner, in the forms of a national data center and corresponding availability zone 304, a national data centers and corresponding availability zone 302, a regional data centers and corresponding availability zone 372, a regional data center and corresponding availability zone 371, and a plurality of breakout edge data centers 389-391, as shown.

In particular, diagram 300 shows each one of a multitude of distinct network functions that are being executed within the cloud computing platform as part of the fifth-generation cellular telecommunication network core. These network functions may include generic management cluster network functions 312-328, a call session control function 332, an Internet protocol short message gateway function 334, a unified data management/authentication server function 336, a secure telephone identity revisited (STIR) and signature-based handling of asserted information using tokens (SHAKEN) function 340, a service centralization and continuity application server function 342, a home subscriber server (HSS)/home subscriber register (HLR) function 344, a development management function 346, a short message service function 348, a shared data layer/zero touch service function 350, an equipment identity register network function 352, an access session border controller directed to media function 380, an interconnect session border controller directed to media function 382, an access session border controller directed to network function 384, an interconnect session border controller directed to signaling function 385, a multimedia resource function 386 directed to transcoding, an access border controller directed to zero touch service function 390, a multimedia resource function 393 directed to general functioning, an access and mobility management function 374, an evolved packet data gateway function 373, a session management function 375, a user plane function 376 directed to voice, and a user plane function 394 directed to cellular Internet data.

As further shown within diagram 300, the cloud computing platform can provide different types of clusters to accommodate different customer preferences or requirements. A legend 370 helps to indicate four illustrative examples of such different types of clusters that the cloud computing platform provides to the cellular telecommunication network carrier. As shown, legend 370 indicates that these different types of clusters may include a virtual network function, a normal cluster for a containerized network function at a national data center, a performance cluster for a containerized network function at a national data center, and the performance cluster for a containerized network cluster at a regional data center or a breakout edge data center. The different hatching used within diagram 300 helps to illustrate how the virtual network function type of cluster may be used for cluster 308 executing generic management cluster network functions 312-328, the normal type of cluster for containerized network functions at a national data center may be used for the network functions executing within a cluster 330, the performance type of cluster for containerized network functions at a national data center may be used for the network functions executing at a cluster 378, and the performance type of cluster for containerized network functions executing at regional data centers and/or breakout edge data centers may be used for the network functions executing at a cluster 373 and a cluster 393. Generally speaking, the performance types of clusters may be used for network functions that have a higher degree of criticality or importance to the overall functioning of the cellular telecommunication network, or which require or request higher resiliency, lower latency, or lower processing times, in comparison to other network function such that the performance types of clusters provide higher speed or reliability, for example, even if the cost is higher.

Figure 3B:
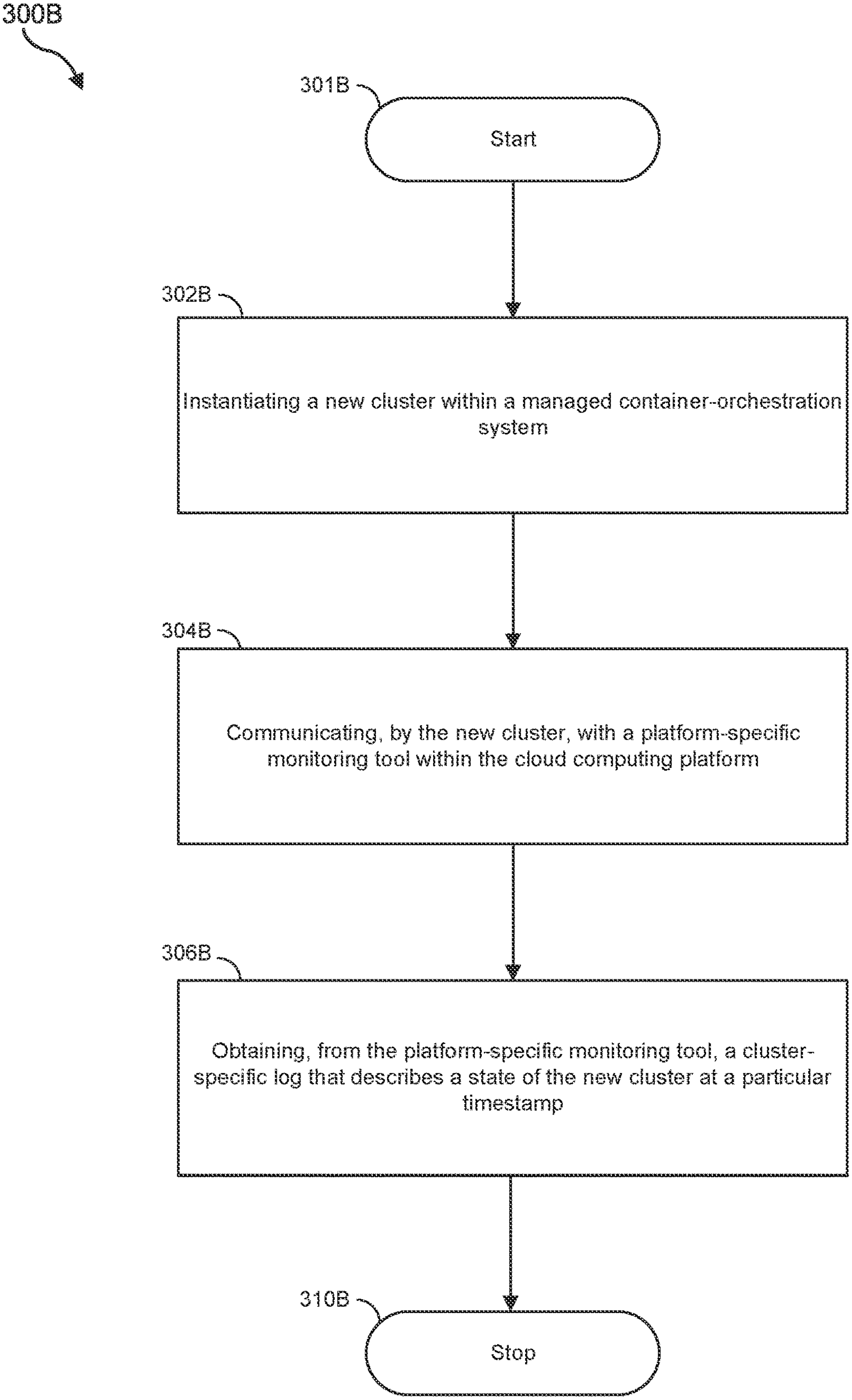
FIG. 3B shows a flow diagram for an example method relating to platform-specific monitoring tools providing logs corresponding to different types of clusters within a managed container-orchestration system.

FIG. 3B shows a flow diagram for an example method 300B relating to platform-specific monitoring tools providing logs corresponding to different types of clusters within a managed container-orchestration system. As explained above in connection with FIG. 3A and legend 370, different types of clusters may be assigned to, or provisioned for, different types of network functions within the cloud-implemented cellular telecommunication network core. To help achieve the quantitative and qualitative improvements discussed above, a platform-specific monitoring tool of the cloud computing platform may be leveraged to provide a better understanding of the current state of one or more components of the network core. At step 301B, method 300B may begin or start. At step 302B, method 300B may include instantiating a new cluster within a managed container-orchestration system. At step 304B, method 300B may include communicating, by the new cluster, with a platform-specific monitoring tool within the cloud computing platform. At step 306B, method 300B may include obtaining, from the platform-specific monitoring tool, a cluster-specific log that describes a state of the new cluster at a particular timestamp. The log may be cluster-specific in the sense that different types of clusters (see legend 370 in FIG. 3A) may result in, or may correspond to, different types of logs from the platform-specific monitoring tool. The corresponding log may be ingested into a pattern detection component (see pattern detection 426 in FIG. 4 and data apps 864 in FIG. 8) and then finally stored within a storage bucket of the cloud computing platform, such as an S3 bucket (see bucket 930 in FIG. 9) in the context of cloud storage containers for objects stored within simple storage service (S3) or other object storage. At step 310B, method 300B may stop or conclude.

In one example, the three different types of logs may correspond to three different types of clusters: performance clusters, generic clusters, and management clusters. Due to their nature relating to low latency, performance clusters may provide logs at a higher frequency, such as every 15 seconds. As used herein, the term "log" can generally refer to a snapshot description of how a particular cluster is performing or operating at a particular time stamp. Such a log may describe one or more of the following items of data: how much computational power is available, CPU utilization, memory utilization, one or more limitations that have been specified with respect to the cluster, general usage, how much free space is available, etc. In contrast, in some examples, generic clusters and/or management clusters may provide logs at lower frequencies, such as every 60 seconds.

Figure 4A:
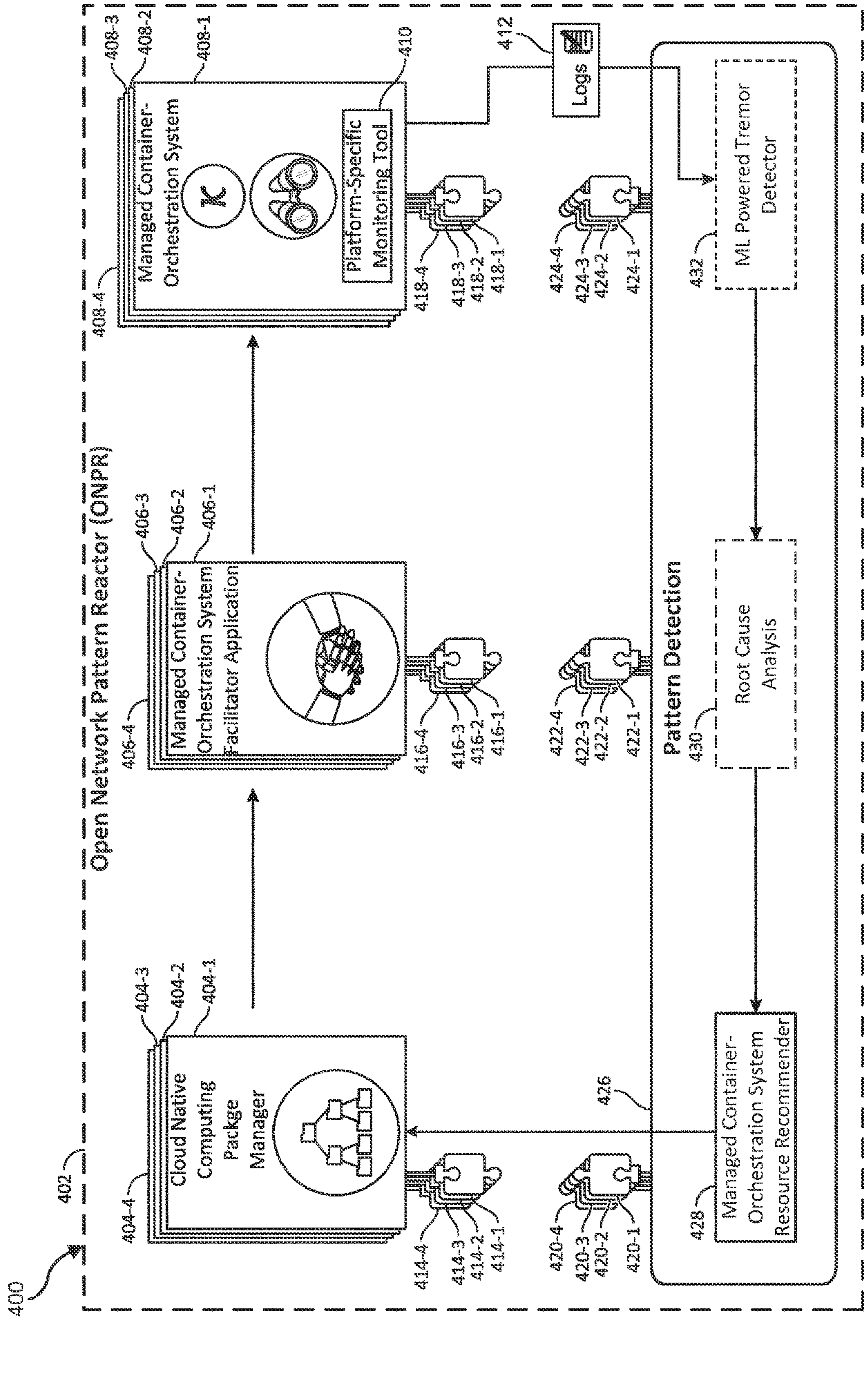
FIG. 4A shows a diagram of a first open network pattern reactor.

FIG. 4A shows a diagram 400 of an open network pattern reactor 402, which may help to achieve a self-improving cellular telecommunication network core. Open network pattern reactor 402 may be "open" in a sense analogous to an "open radio access network." Open network pattern reactor 402 may include a cloud native computing package manager 404-1 and a managed container-orchestration system 408-1, as discussed above in the context of method 100 in FIG. 1. Additionally, open network pattern reactor 402 may also further include a managed container-orchestration system facilitator application 406-1, which may facilitate the deployment of a file chart generated by cloud native computing package manager 404-1 onto a cloud computing platform using managed container-orchestration system 408-1, as discussed further below. One illustrative example of such a managed container-orchestration system facilitator application may include Weave Works and/or its GitOps application. In some examples, cloud native computing package manager 404-1, managed container-orchestration system facilitator application 406-1, and/or managed container-orchestration system 408-1 may be configured together across a continuous integration and continuous delivery (CI/CD) pipeline, where managed container-orchestration system facilitator application 406-1 automates and/or facilitates the configuration or maintenance of the continuous integration and continuous delivery pipeline.

Additionally, as further shown within diagram 400, open network pattern reactor 402 may further include pattern detection 426, which may include a managed container-orchestration system resource recommender 428, a root cause analysis 430, and/or a machine learning powered tremor detector 432, such as an anomaly detector, for example. Pattern detection 438 may correspond to the machine learning model of method 100, although one or more of its subcomponents shown in FIG. 4A may be optional. Moreover, diagram 400 also further illustrates how managed container-orchestration system 408 may further include a platform-specific monitoring tool 410, which may provide one or more instances of logs, such as logs 412, described above in the context of FIG. 3A and diagram 300.

As discussed above, in some examples, pattern detection 426 may operate in a plug-and-play manner with respect to cloud native computing package manager 404-1, managed container-orchestration system facilitator application 406-1, and/or managed container-orchestration system 408-1. Generally speaking, pattern detection 426 may be generated by a software development kit, may form a software development kit, and/or may be included within a software development kit. In such examples, the software development kit and/or its generated program can include a plug-and-play component that interfaces with the cloud native computing package manager in a manner that is agnostic between different brands of cloud native computing package manager. Additionally, or alternatively, in some examples the software development kit is configured such that deploying the modified file chart is performed through a managed container-orchestration system facilitator application. In these examples, the software development kit can include a plug-and-play component that interfaces with the managed container-orchestration system facilitator application in a manner that is agnostic between different brands of managed container-orchestration system deployment facilitator applications. Similarly, in further examples, the software development kit can include a plug-and-play component that interfaces with the managed container-orchestration system in a manner that is agnostic between different brands of managed container-orchestration systems.

As further shown within FIG. 4A, pattern detection 426 and a remaining portion of open network pattern reactor 402 may be interconnected and/or interrelated using a plug-and-play methodology through one or more application programming interfaces 414-1 to 414-4, 416-1 to 416-4, 418-1 to 418-4, 420-1 to 420-4, 422-1 to 422-4, and 424-1 to 424-4. These application programming interfaces indicate that, although pattern detection 426 can connect to or interface with a specific brand, product, and/or solution corresponding to cloud native computing package manager 404-1, pattern detection 426 can also substitute cloud native computing package manager 404-1 with any one or more of different brands, products, and/or solutions providing essentially parallel functionality using a different application programming interface and/or file format, etc. Accordingly, cloud native computing package manager 404-1 may be substituted for one or more of cloud computing package managers 404-2 to 404-4. The same can be said, in a parallel manner, for managed container-orchestration system facilitator application 406-1, which can be substituted for one or more of managed container-orchestration system facilitator applications 406-2 to 406-4. Similarly, managed container-orchestration system 408-1 can be substituted for one or more of managed container-orchestration systems 408-2 to 408-4.

By way of illustrative example, if managed container-orchestration system 408-1 corresponds to AMAZON EKS (Managed Kubernetes Service), which provides a managed Kubernetes service in the AMAZON AWS public cloud, then pattern detection 426 may substitute a different one of managed container-orchestration system 408-2 through 408-4, which may provide essentially the same functionality from a different brand or source, such as Microsoft, Meta, Alphabet, Apple, etc., while using a different application programming user interface and/or file format.

In terms of workflow, pattern detection 426 and/or machine learning powered tremor detector 432 may ingest one or more of the logs generated by platform-specific monitoring tool 410. In some examples, the logs may form JSON files. The logs and/or JSON files may be ingested into a pre-processing component (see data ingestion/pre-processing 1002 in FIG. 10). Machine learning powered tremor detector 432 may responsively check whether any one or more of the pre-processed logs, and/or subcomponents of the logs, indicate a predicted network tremor or anomaly. In that case, the corresponding log and/or log subcomponent may be provided to root cause analysis 430, which can extract an estimated root cause of the predicted network tremor or anomaly. Similarly, managed container-orchestration system resource recommender 428 may recommend a change in the configuration of the cellular telecommunication network core and/or the file chart corresponding to the network core and generated by cloud native computing package manager 404-1, based on the input of the extracted root cause provided by root cause analysis 430.

Optionally, the results of detecting whether or not one or more logs or log subcomponents indicates a tremor or anomaly may be indicated to a human data analyst or network engineer. The human data analyst or network engineer, individually or in cooperation with open network pattern reactor 402, may determine or recommend one or more specific actions or network modifications to be performed in response. Alternatively, in another example, open network pattern reactor 402 may operate in a manner that is effectively autonomous and self-improving, thereby minimizing or eliminating human intervention, as discussed in more detail below.

Generally speaking, cloud native computing package manager 404-1 may manage, administer, maintain, and/or deploy one or more file packages that defines or specifies all, or part of the corresponding cellular telecommunication network core implemented on the cloud computing platform. Accordingly, any change to the cellular telecommunication network core may be associated with a corresponding change to the file package. Such a change may be recommended by managed container-orchestration system resource recommender 428, resulting in the modified or updated file package being generated by cloud native computing package manager 404 and deployed using managed container-orchestration system 408-1 on a cloud computing platform and its corresponding data centers. One or more examples of managed container-orchestration system facilitator application 406-1 may assist, facilitate, streamline, and/or render more efficient this deployment process, as further discussed above.

Both FIG. 4 and FIG. 5 help to show the self-improving nature of open network pattern reactor 402. In the example of diagram 400, the interactions or relationships within open network pattern reactor 402 may form a closed loop without any necessary or suggested human intervention. The option to eliminate or reduce one or more instances of human intervention can eliminate or reduce human error, eliminate or reduce the cost of human capital or resources, and/or eliminate or reduce inefficiencies or latencies associated with human labor. For example, open network pattern reactor 402 can generally operate in a closed-loop more quickly and accurately in an autonomous manner without human intervention, whereas human intervention may introduce latency and/or inaccuracies into the corresponding procedures for improving the performance of the cellular telecommunication network core.

As discussed above, machine learning powered tremor detector 432 may be powered by machine learning. The machine learning model generated by, or corresponding to, machine learning powered tremor detector 432 may be descriptive in the sense that it predicts future states of the network or one or more network subcomponents in response to previous or current states of the network or its subcomponents. Additionally, or alternatively, machine learning powered tremor detector 416 may be descriptive in the sense of simply identifying statistical or other tremors or anomalies, which deviate beyond a threshold or other indicator of normal or expected performance variation, without necessarily indicating or suggesting a future state of the network. In other words, in some examples machine learning powered tremor detector 432 can identify tremors, anomalies, and/or warnings regarding abnormalities in terms of network behavior without necessarily suggesting a future consequence of such abnormalities.

Additionally, or alternatively, managed container-orchestration system resource recommender 428 may also be powered by machine learning. In some examples, managed container-orchestration system resource recommender 428 may form, or correspond to, a machine learning model that is distinct and independent from machine learning powered tremor detector 432. In other examples, managed container-orchestration system resource recommender 428 and machine learning powered tremor detector 416 may form part of the same machine learning model or subcomponents within the same overall machine learning model.

In some examples, managed container-orchestration system resource recommender 428 may be prescriptive rather than descriptive, in contrast to machine learning powered tremor detector 432. Accordingly, rather than merely (i) flagging or labeling anomalous network behavior and/or (ii) describing predicted future events in response to previous or current events are network conditions, managed container-orchestration system resource recommender may prescriptively label an ingested description of a condition of a network and/or network subcomponent with a corresponding recommended action and/or recommended network modification. In some examples, managed container-orchestration system resource recommender 428 may operate on output from root cause analysis 430 in a manner that deemphasizes and/or excludes one or more items of more comprehensive log information used as the input to root cause analysis 430. In other words, in these examples, managed container-orchestration system resource recommender 428 may rely upon root cause analysis 430 to at least partially strip-down and/or simplify one or more instances of more comprehensive logs to thereby focus upon the extracted root cause generated as the output of root cause analysis 430. In response to ingesting a description of the extracted root cause from root cause analysis 430, managed container-orchestration system resource recommender 428 may label or classify the root cause with a recommended action or recommended network modification, or otherwise output such a recommendation.

When adopting a recommended specific action or network modification, the corresponding action or modification may be implemented by changing the file chart generated by cloud native computing package manager 404-1 (i.e., modifying inputs to cloud native computing package manager 404-1 such that cloud native computing package manager 404-1 generates a modified file chart different than a previous version of the file chart that cloud native computing package manager 404-1 generated in a previous iteration), since the file chart effectively defines, structures, or configures the corresponding cellular telecommunication network core in the context of the virtualized environment provided by the cloud computing platform. More generally, the recommended actions or network modifications may include granular changes to the configurations of the managed container-orchestration system clusters deployed for implementing the cellular telecommunication network core.

Figure 4B:
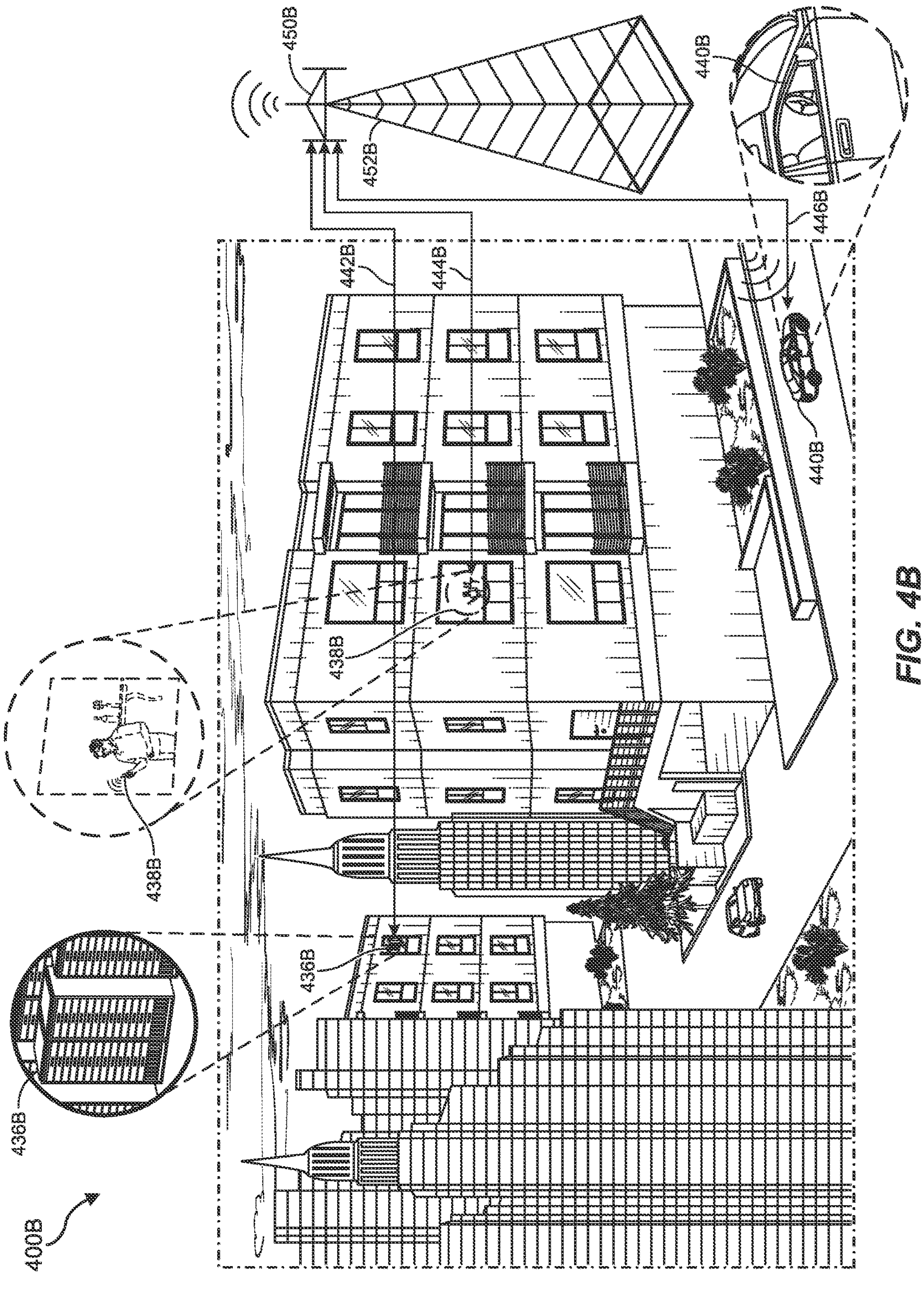
FIG. 4B shows a diagram of various types of user equipment connected to a cellular telecommunication network core.

FIG. 4B shows a diagram 400B of various types of user equipment connected to a cellular telecommunication network core. As further shown within this figure, the different instances of user equipment may correspond to different customer use cases that may be applicable to open network pattern reactor 402. Diagram 400B shows backend data servers 436B, within a data center, which may be uploading according to a nighttime schedule, as discussed in connection with FIG. 4C. Diagram 400B also shows a user operating a smartphone 438B in order to access a social networking application. In some examples, open network pattern reactor 402 may address network congestion that would predictably arise when trying to service smartphone 438B and backend data servers 436B simultaneously, as discussed further in connection with FIG. 4G. Lastly, diagram 400B further shows an autonomous car 440B, which can be driving along a conventional neighborhood street without a human in the driver seat, as shown. This autonomous car represents just one example of a scenario involving or requiring specialized network performance and corresponding configurations, including configurations involving ultra low latency, guaranteed bit rates, 99.999% uptime, etc. Such configurations or features associated with fifth generation cellular technology and beyond may enable applications such as remote surgery, smart cities, and/autonomous driving, etc. Within diagram 400B, all of these different instances of user equipment may be connected to a cellular base station 452B, including an antenna 450B, as indicated by connecting lines 442B-446B.

Figure 4C:
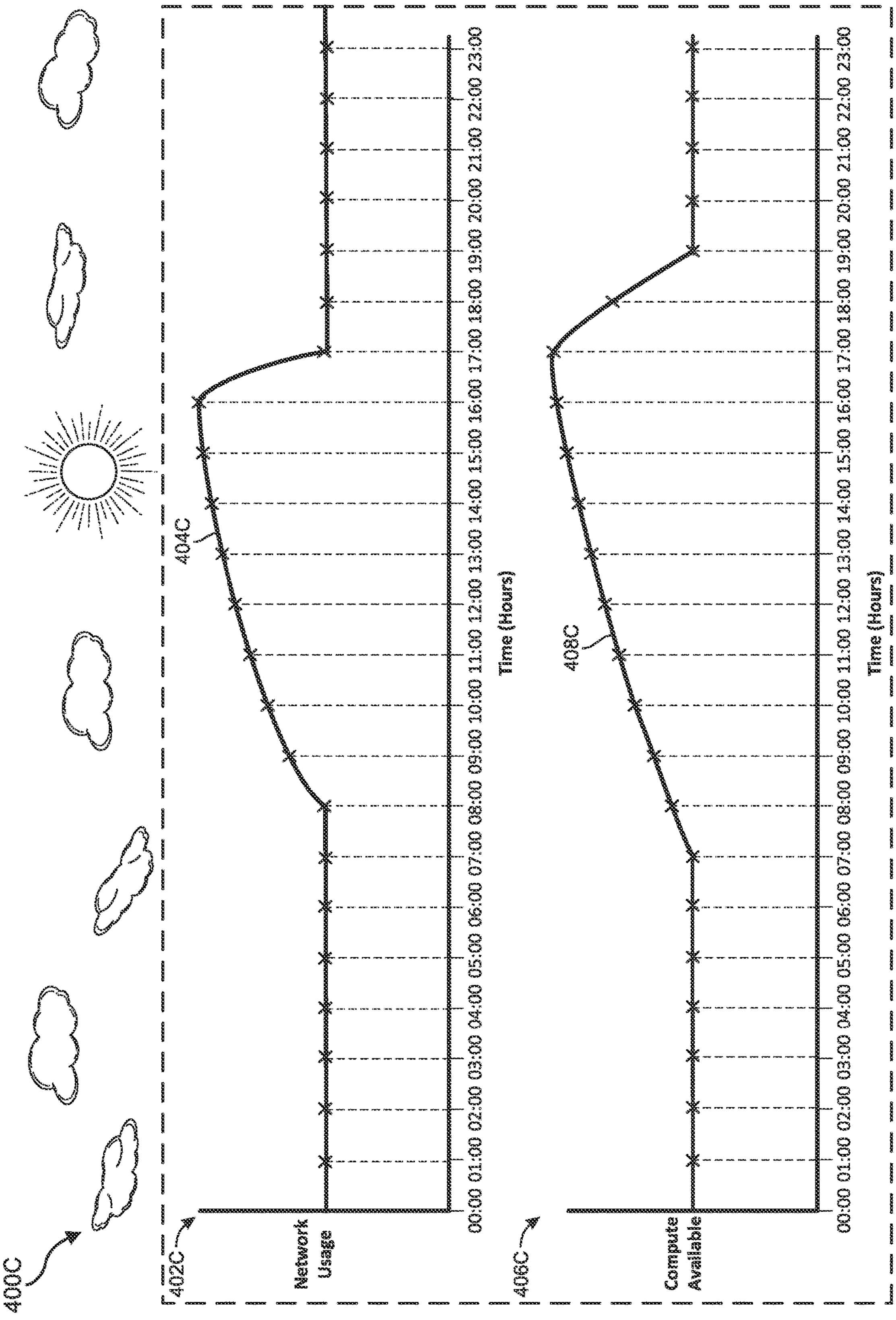
FIG. 4C shows a timing diagram of network consumption increasing during daytime hours.

FIG. 4C shows a timing diagram 400C of network consumption increasing during daytime hours. As further shown within this figure, businesses can typically increase network consumption during normal work hours. Accordingly, diagram 400C includes a chart 402C that shows network usage increasing between 8:00 AM and 5:00 PM along a curve 404C. Accordingly, open network pattern reactor 402 may predict the corresponding surge and network usage and begin to increase computational power or computational processing around 7 AM, prior to the beginning of the surge at 8 AM, and then reducing computational power or computational processing around 7 PM, after the surge in network usage has concluded, as shown along a curve 408C in a chart 406C.

Figure 4D:
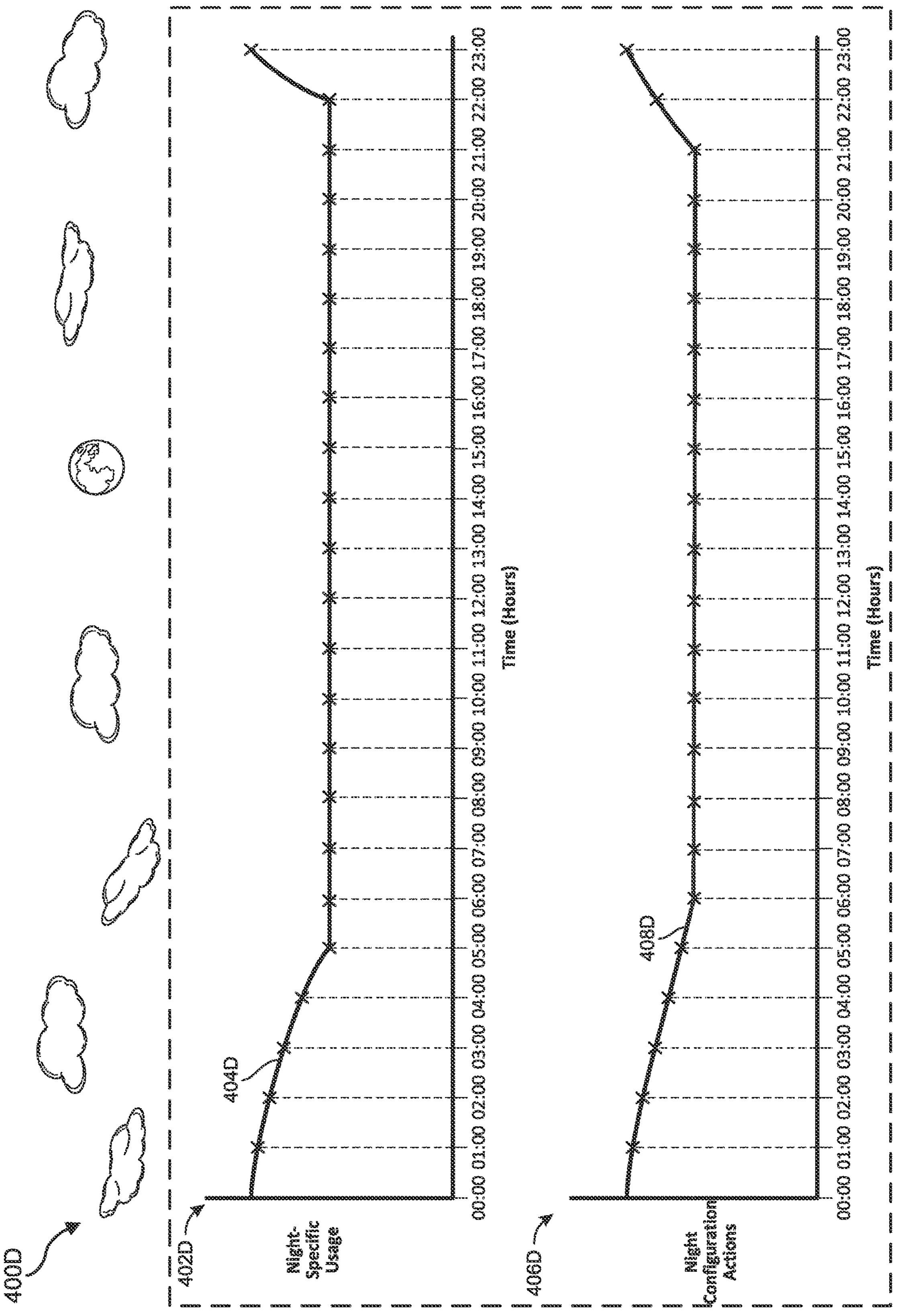
FIG. 4D shows a timing diagram of server uploads and Internet-of-things updates occurring during nighttime hours.

FIG. 4D shows a timing diagram 400D of server uploads and Internet of things updates occurring during nighttime hours. Similar to timing diagram 400C, timing diagram 400B shows that certain activities or actions associated with night-specific usage may surge during nighttime hours corresponding approximately from 11 PM to 5 AM, as shown along a curve 404D within a chart 402D. Such night-specific usage may include uploading or archiving telemetry or other monitoring data to a backend server from a customer endpoint and/or downloading or updating drivers or other data for Internet of things devices, etc. In other words, these night-specific usage activities may generally correspond to background processes that are safely performed during nighttime hours without disturbing or interfering with one or more user's customer experience with the network during working or daytime hours. Accordingly, open network pattern reactor 402 may perform one or more actions to configure part of the cellular telecommunication core to accommodate the predicted surge in night-specific usage, as shown by a curve 408D within a chart 406D within diagram 400D. Such a configuration may include increasing the upload bandwidth, speed, and/or other network resources available to the end-user (without necessarily increasing download resources) and/or situating one or more components closer to a destination server receiving the uploaded data, for example.

Figure 4E:
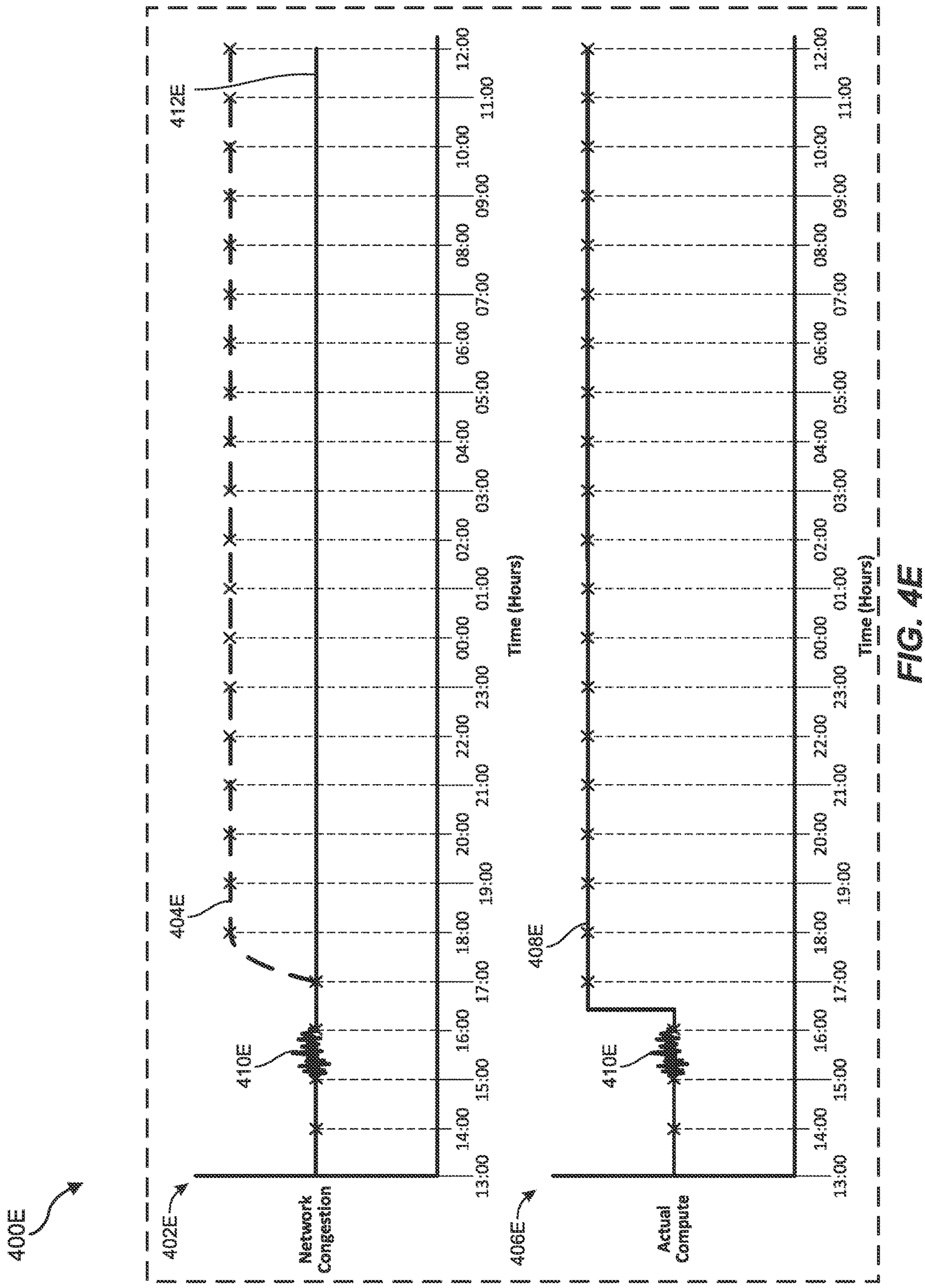
FIG. 4E shows a timing diagram of a detected network tremor predicting a surge in network consumption.

FIG. 4E shows a timing diagram 400E of a detected network tremor predicting a surge in network consumption. As shown, diagram 400E may indicate that a detected or predicted network tremor 410E further predicts network congestion and/or other network problems that may occur in the future, which can correspond to a curve 404E of predicted network congestion within a chart 402E. To address this predicted problem, open network pattern reactor 402 may increase the amount of available computational power or computational processing, as indicated by a curve 408E within a chart 406E. The boost in the amount of available computational power or computational processing corresponding to curve 408E may result in the predicted network congestion of curve 404E being avoided and, instead, network congestion remaining low along a curve 412E.

Figure 4F:
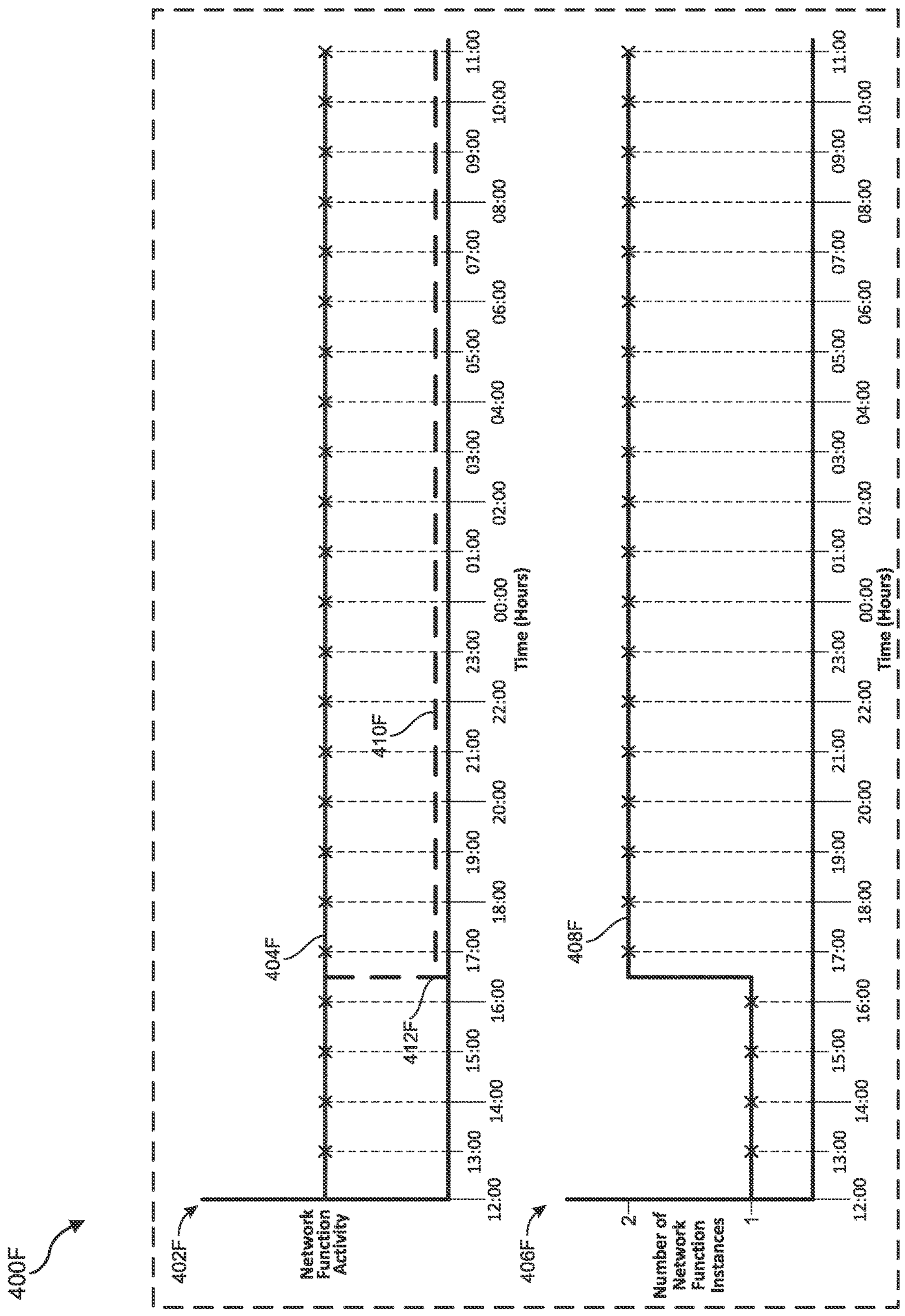
FIG. 4F shows a timing diagram of a predicted network failure and its corresponding prevention.

FIG. 4F shows a timing diagram 400F of a predicted network failure and its corresponding prevention. As further shown within this figure, at a point.412F within a chart 402F the predicted activity of a containerized network function may plummet effectively to zero, thereby indicating that the corresponding containerized network function has failed. Without intervention, the containerized network function may continue to be inactive along a curve 410F within chart 402F. Open network pattern reactor 402 may detect this predicted failure and responsively double a number of instances of the corresponding containerized network function (e.g., UPF) from a single instance to two separate instances at approximately 4:30 PM, as shown along a curve 408F within a chart 406F. Accordingly, the corresponding level of activity for that type of network function may remain relatively stable and active along a curve 404F within chart 402F, thereby preventing the overburdening and predictable failure of the single instance of the containerized network function when the corresponding burden can be shared across two separate instances, as shown within diagram 400F.

Figure 4G:
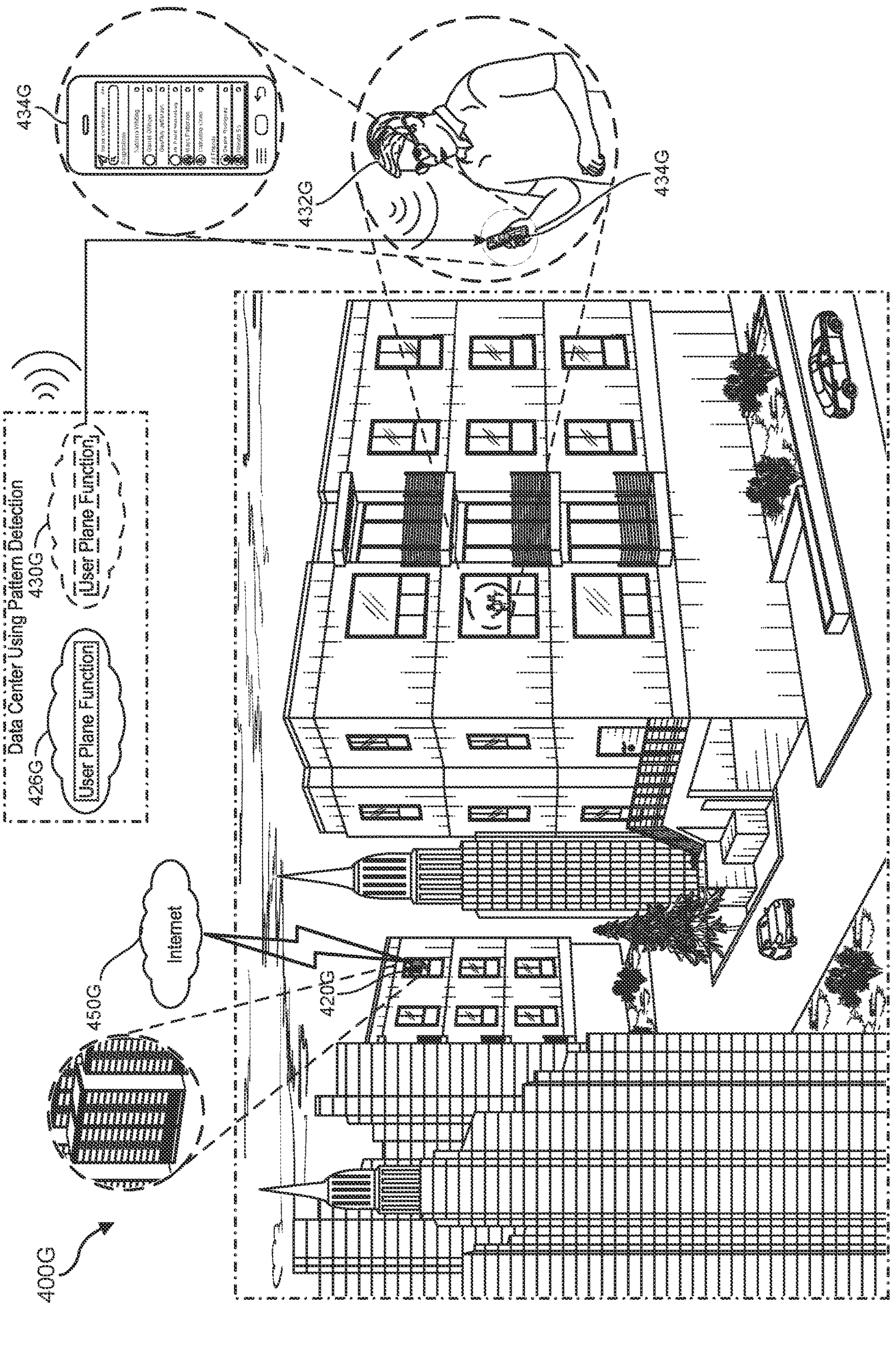
FIG. 4G shows a diagram illustrating the dynamic creation and usage of an additional instance of a user plane function in response to network congestion.

FIG. 4G shows a diagram 400G illustrating the dynamic creation and usage of an additional instance of a user plane function in response to network congestion. In this example, backend server racks 420G may be uploading massive amounts of data to the Internet 450G at the same time that a user 432G is operating a smartphone 434G to access a social networking application. Because of the increased demand created by backend server racks 420G, a single instance 426G of the user plane function may become overburdened and threaten to disrupt or disturb the customer experience of the user 432G. Open network pattern reactor 402 may detect this predictable deficiency and, in response, may create or spin up a second instance 430G of the user plane function. The second instance 430G of the user plane function may assist in servicing the user 432G who is interacting with the social networking application while the network is under increased demand or congestion due to backend server racks 420G. Moreover, when the massive uploading procedure performed by backend server racks 420G has completed, then open network pattern reactor 402 may intelligently disable or remove the second instance 430G of the user plane function, as shown.

Figure 4H:
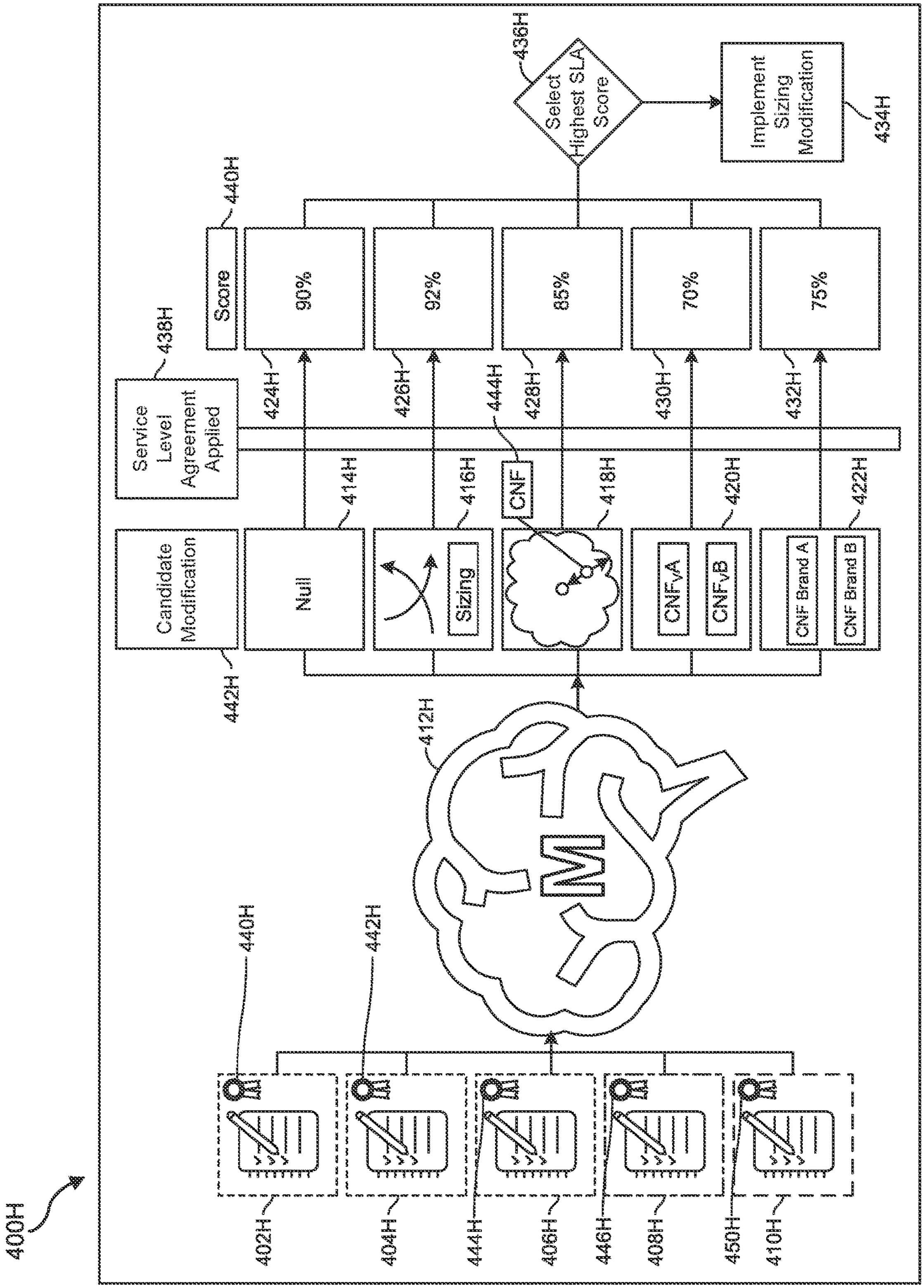
FIG. 4H shows a figurative diagram indicating the relationship between inputs and outputs to a machine learning model in the context of a cellular telecommunication network core.

FIG. 4H shows a figurative diagram 400H indicating the relationship between inputs and outputs with respect to a machine learning model in the context of a cellular telecommunication network core. As further shown in this figure, diagram 400H may indicate how a machine learning model 412H may receive as input one or more logs 402H-410H, where any one or more of these may be optionally labeled with one of labels 440H-450H that identifies a corresponding containerized network function being executed on a corresponding resource of the cloud computing platform being monitored according to the logs. As used herein, the term "machine learning model" may be used expansively to cover any system or methodology that generates outputs based on inputs according to machine learning calculations or mathematics. In some examples, the machine learning model may be composed of or include one or more sub-models, which can also constitute machine learning models. For example, anomaly detection can be performed using an autoencoder or hidden Markov model for nodes in the network, using an autoencoder for pods on the network, and/or using a principal component analysis model for containers on the network. In some examples, the machine learning model may be simply descriptive, such as descriptively predicting a future state of the cellular telecommunication network in response to one or more candidate network modifications. Additionally, or alternatively, in some examples the machine learning model may be prescriptive, consistent with the example of diagram 408, in which case the machine learning model may recommend a particular network modification, such as by comparing different results of different candidate network modifications with levels of satisfaction of a corresponding service level agreement, as discussed in more detail below. In these examples, the machine learning model can use a basic descriptive model to predict an output for each one of respective different network states or modifications and then prescriptively evaluate each of these predicted outcomes and recommend the best, optimal, highest scoring, or last costing option.

Based upon the received information being input, machine learning model 412H can generate a set of candidate modifications, as indicated by a headline 442H. As used herein, the term "candidate modification" including the adjective "candidate" can refer broadly to both specific changes or deviations to the cellular telecommunication network core and/or to maintaining a current state of the cellular telecommunication network core rather than performing an actual modification. The example of diagram 400H shows five different candidate modifications 414H-422H. Candidate modification 414H corresponds to the null response or a decision to maintain the current configuration of the cellular telecommunication network core. Candidate modification 416H refers to a sizing modification to the cellular telecommunication network core, in which one or more resources may be dynamically or elastically increased or decreased in number or intensity, for example. Candidate modification 418H refers to locating or relocating a resource, such as a containerized network function 444H, to a particular or different location within the cloud computing platform. In particular, containerized network functions may be relocated, in some examples, closer to, or away from, the edge of the network or a centralized location within the network. Candidate modification 420H refers to specifying, changing, or updating a version of a containerized network function. Additionally, or alternatively, candidate modification 422H refers to specifying, changing, or updating a source or brand from which a particular containerized network function originates.

A headline 438H indicates that, in response to the generation of various candidate network modifications, machine learning model 412H or open network pattern reactor 402 may compare a predicted result of the network modification with a service level agreement. This comparison may result in scores 424H-432H, as indicated by a headline 440H, which indicates how well the predicted update to the cellular telecommunication network core would satisfy the service level agreement while also minimizing cost, for example. In general, the corresponding score may be sensitive to costs such that the scoring algorithm or heuristic, or other business logic, does not attempt to maximize the service level agreement without regard to cost, in which case an unreasonably large or infinite expenditure of cost may be used to maximize the service level agreement. Rather, the corresponding scoring algorithm may intelligently attempt to maximize price-performance with respect to the service level agreement and while reflecting or respecting one or more different weights indicating how sensitive or avoidant the scoring algorithm should be with respect to cost expenditures. In particular, from among multiple different candidate modifications that each successfully satisfy the service level agreement, the machine learning model may intelligently select the particular candidate modification that satisfies the service at the lowest cost. At a decision step 436H, the machine learning model or open network pattern reactor may select the candidate network modification resulting in the highest predicted score. In the example of diagram 400H, this may correspond to candidate modification 416H, as shown, such that the machine learning model may subsequently perform, initiate, or otherwise command the implementation of that specific candidate modification to the cellular telecommunication network core at a step 434H.

Figure 4I:
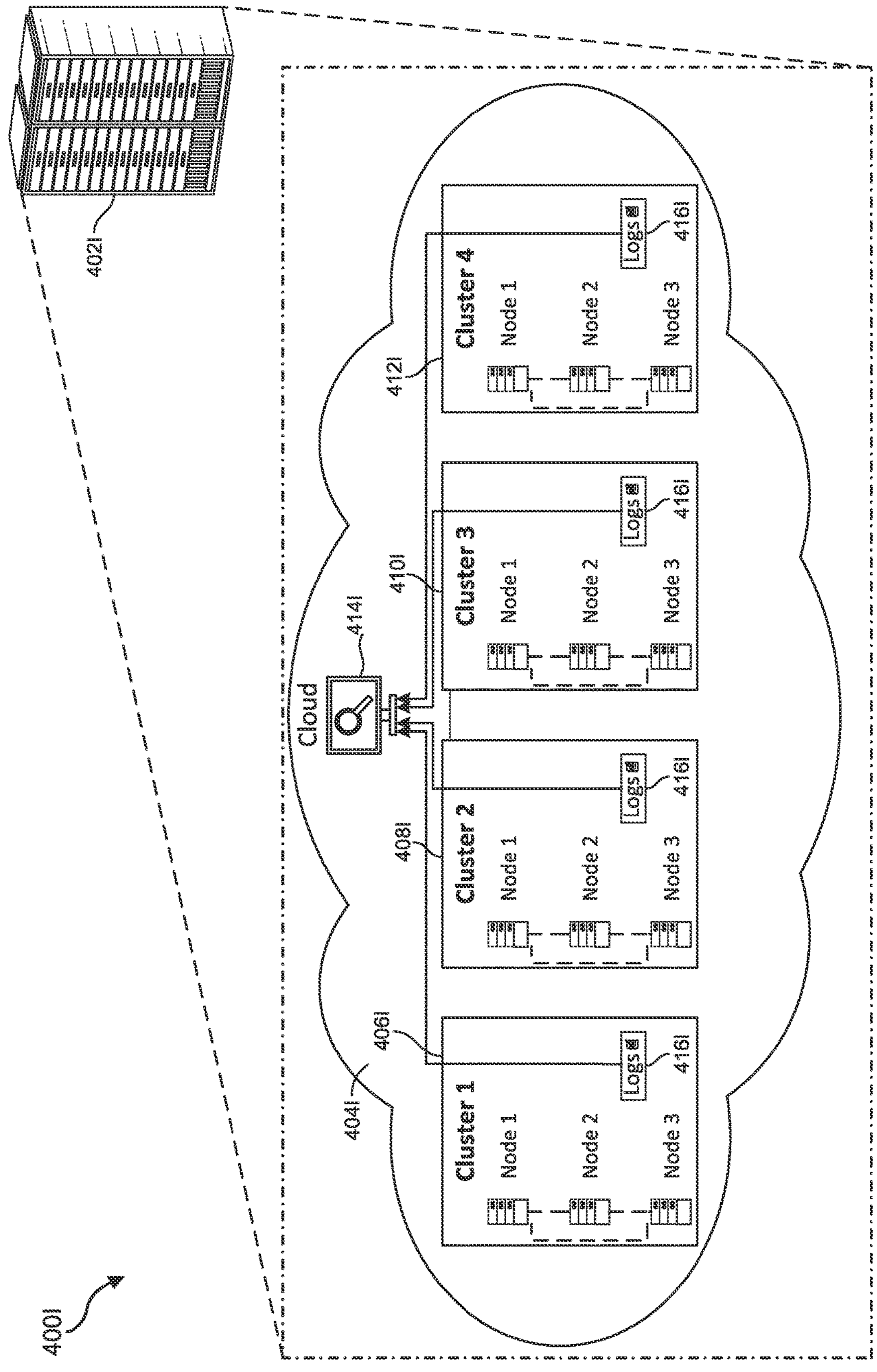
FIG. 4I shows a figurative diagram helping to explain the operation of a platform-specific monitoring tool within a cloud computing platform.

FIG. 4I shows a figurative diagram 400I helping to explain the operation of a platform-specific monitoring tool within a cloud computing platform. As shown within this figure, a set of one or more backend server racks 402I may implement cloud computing platform 404I, which can include a set of clusters 406I-412I. The cloud computing platform can also provide a platform-specific monitoring tool 414I, which can further generate one or more instances of logs 416I. Platform-specific monitoring tool 414I may be provided by the cloud computing platform, which can be independent and distinct from a cellular service carrier that is maintaining and administering the cellular telecommunication network core, as discussed above. Accordingly, in some examples, platform-specific monitoring tool 414I may provide highly detailed, granular, and/or high-frequency data regarding consumption and usage statistics for various components and subcomponents of the cloud computing network, such as clusters, nodes, microservices, and/or pods, including computational power processing, memory, network transactions, errors, etc., at each one of one or more of the clusters, nodes, microservices, and/or pods. Nevertheless, in some examples, platform-specific monitoring tool 414I may not necessarily have visibility into the configuration of which one or more containerized network functions are being executed on these corresponding cloud computing platform components. Accordingly, in some examples, method 100 may operate at least in part by labeling logs 416I with new information indicating the corresponding containerized network function that is being executed on a particular resource of the cloud computing platform such as a cluster, node, microservice, and/or pod.

Figure 4J:
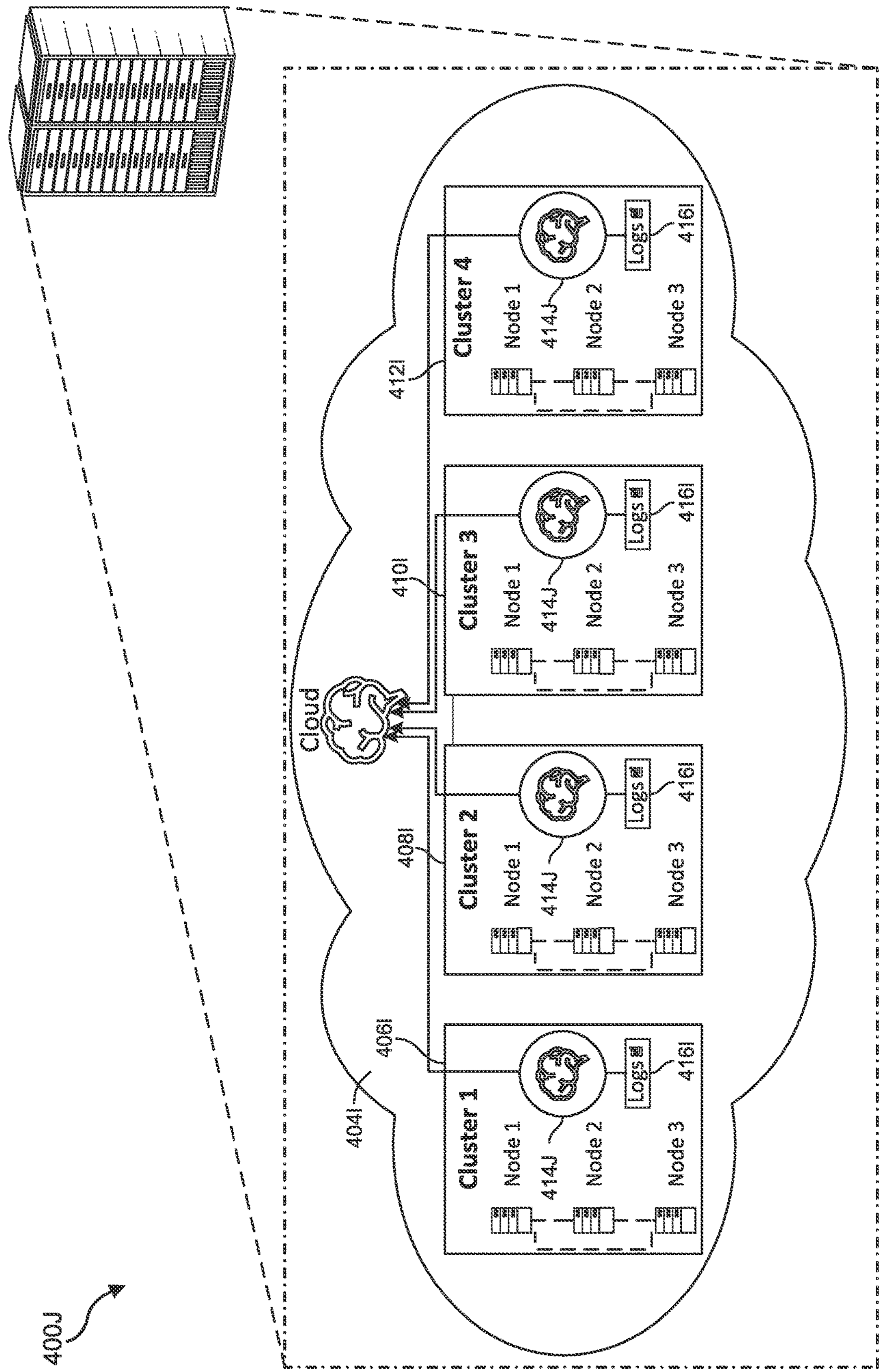
FIG. 4J shows a figurative diagram showing how the machine learning model can be disposed in a plurality of clusters of the managed container-orchestration system.

FIG. 4J shows a figurative diagram 400J showing how the machine learning model can be disposed in a plurality of clusters of the managed container-orchestration system. In the example of this figure, each one of the clusters 406I-412I may be assigned to, or executing, one or more components of the cellular telecommunication network core. In contrast, one or more additional clusters (not shown) of the cloud computing platform may be directed to other customers or other functionality that is independent and distinct from the cellular telecommunication network core. Nevertheless, within each one of a majority, predominant majority, or entirety of the clusters that are executing the cellular telecommunication network core (i.e., clusters 406I-412I), is disposed in instance of the machine learning model 414J, as shown. Accordingly, in the example of this figure, the machine learning model is effectively operating in a distributed manner such that an instance or version of the machine learning model is disposed in each one of a plurality of clusters associated with the cellular telecommunication network core, as shown. Moreover, in various examples, one or more of the instances of the machine learning model may communicate with one or more other instances across a pipeline, such as the illustrative examples of the pipeline shown in FIG. 8 and FIG. 9, as discussed in more detail below.

Figure 4K:
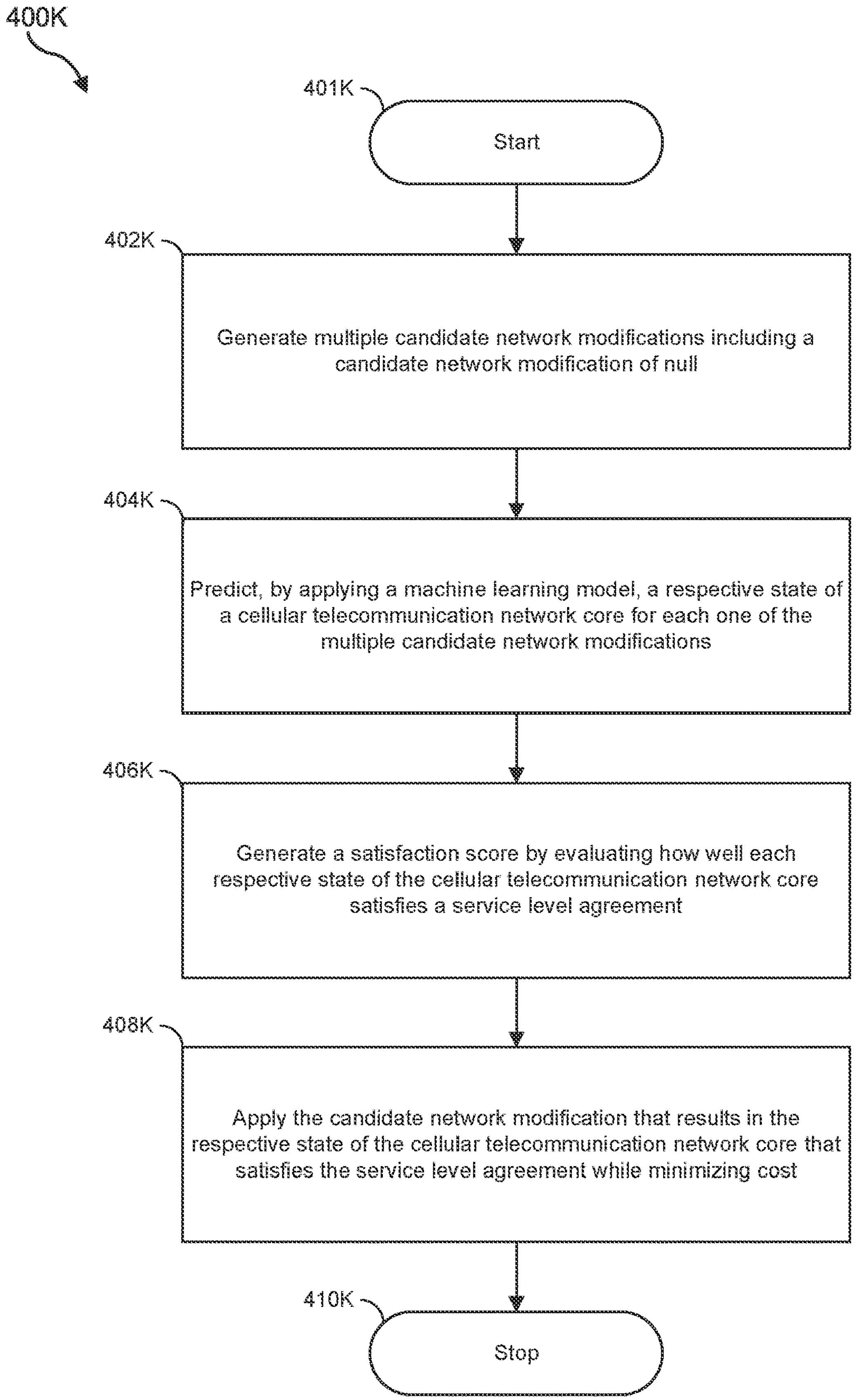
FIG. 4K shows a flow diagram for an example method for performing pattern detection and corresponding self-improving procedures.

Similar to FIG. 4H, FIG. 4K discloses a flow diagram for a method 400K for an example method for performing pattern detection and corresponding self-improving procedures. At step 402K, method 400K may include generating multiple candidate network modifications including a candidate network modification of null. At step 404K, method 400K may include predicting, by applying a machine learning model, a respective state of a cellular telecommunication network core for each one of the multiple candidate network modifications. At step 406K, method 400K may include generating a satisfaction score by evaluating how well each respective state of the cellular communication network core satisfies a service level agreement and/or minimizes cost. Lastly, at step 408K, method 400K may include applying the candidate network modification that results in the respective state of the cellular telecommunication network core that satisfies the service level agreement while minimizing cost. In other words, method 400K can be summarized as first (i) generating, as outputs, a set of multiple predicted states of the cellular telecommunication network core based on, as inputs, a set of respective candidate modifications to the cellular telecommunication network core and then (ii) selecting, as the recommendation, a specific candidate modification from the respective candidate modifications that maximizes a function that is directed to maximizing price performance in terms of satisfying a service level agreement between a carrier of the cellular telecommunication network core and an end-user. As further discussed above, in the example of diagram 400H, the selected candidate network modification may include candidate modification 416H, which relates to sizing up or down a number or intensity of one or more resources being monitored within the cloud computing platform. Additionally, or alternatively, in other examples a different type of network modification may be selected and/or a different variety or multitude of types of network modifications may be applied simultaneously, in a manner that satisfies the service level agreement while minimizing cost, as further discussed above.

Figure 5A:
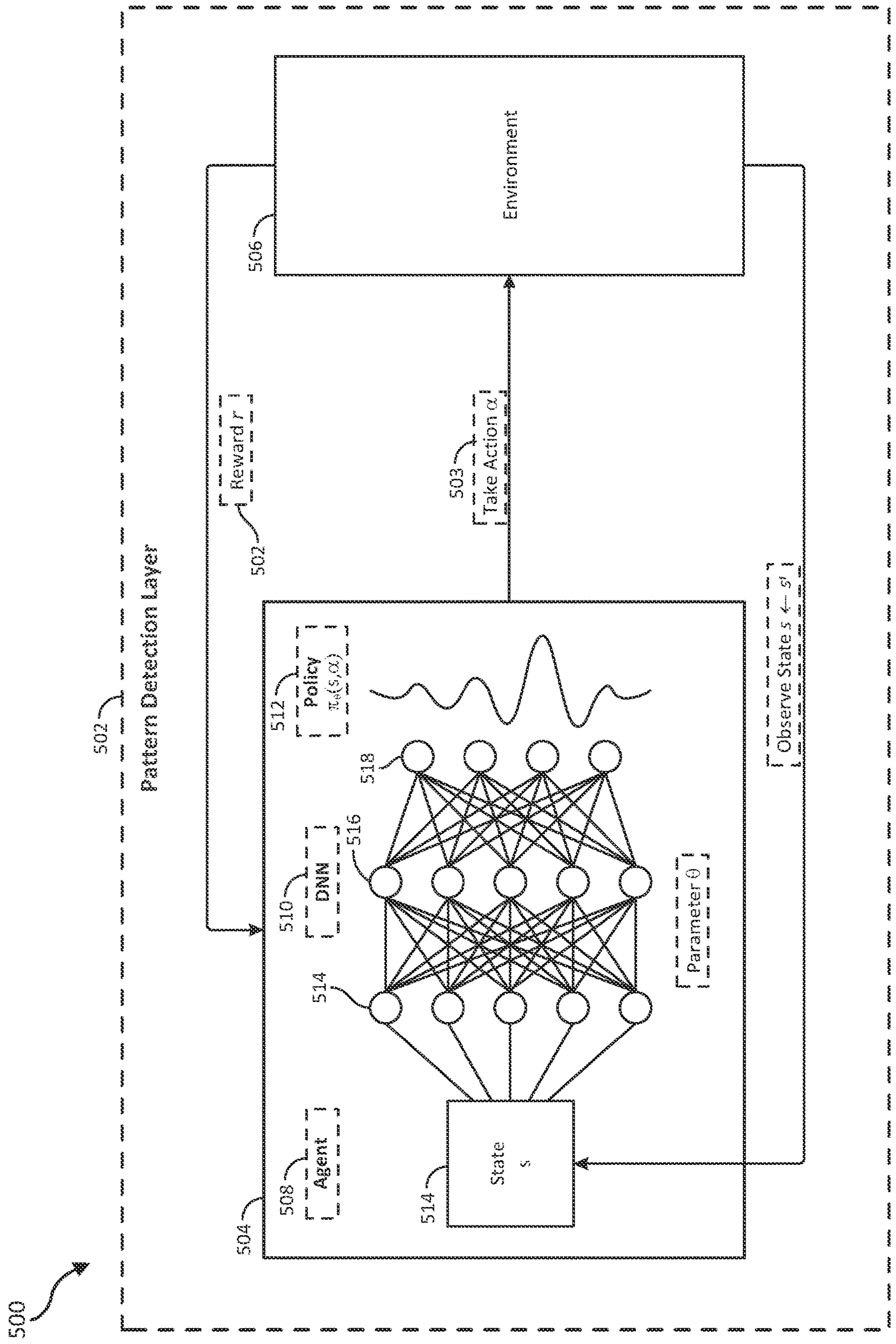
FIG. 5A shows a diagram of a pattern detection layer in the context of a deep neural network.

FIG. 5A shows a diagram 500 of a pattern detection layer in the context of a deep neural network. As further shown within this figure, the pattern detection layer may correspond to a workflow of interactions between a state 514, an agent 508, a deep neural network 510, a policy 512, and an environment 506. Deep neural network 510 may involve at least three separate layers of neurons corresponding to a neuron 514, a neuron 516, and a neuron 518, as shown. Deep neural network 510 may correspond to parameter theta, as shown. In some examples, deep neural network 410 may include a deep q-network or a bidirectional long short-term memory autoencoder, as discussed in more detail below.

In the context of FIG. 5A, in some examples, method 100 may further include outputting, by a deep neural network such as deep neural network 510, a specific cellular telecommunication network core modification, which can correspond to the action indicated by indicator 503, and which can at least partially prevent the predicted network deficiency. Method 100 may perform this act at least in part by modifying the file chart generated by the cloud native computing package manager and deploying the modified file chart, as further discussed above.

Figure 5B:
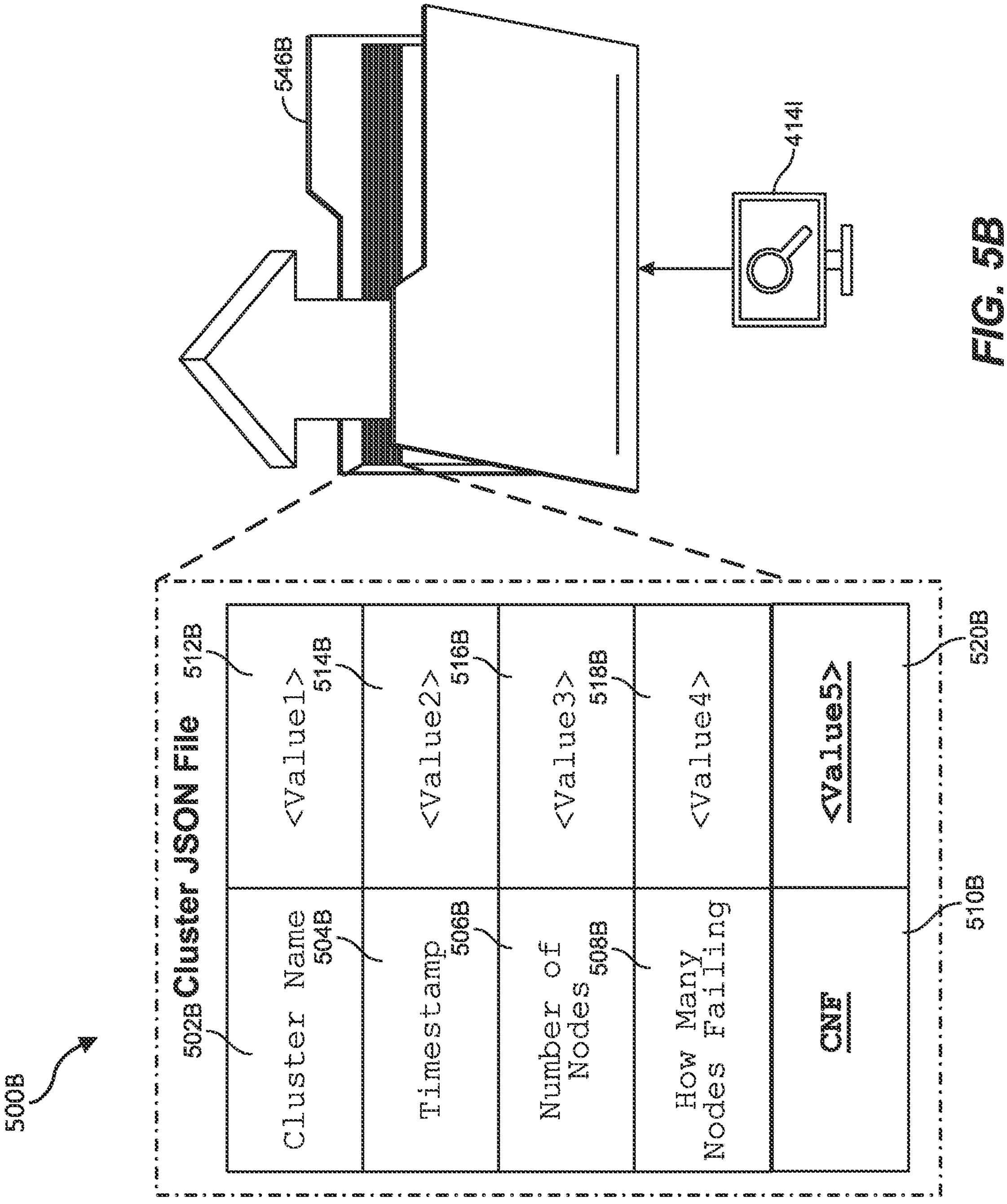
FIG. 5B shows a diagram of a JSON file corresponding to a cluster.
Figure 5C:
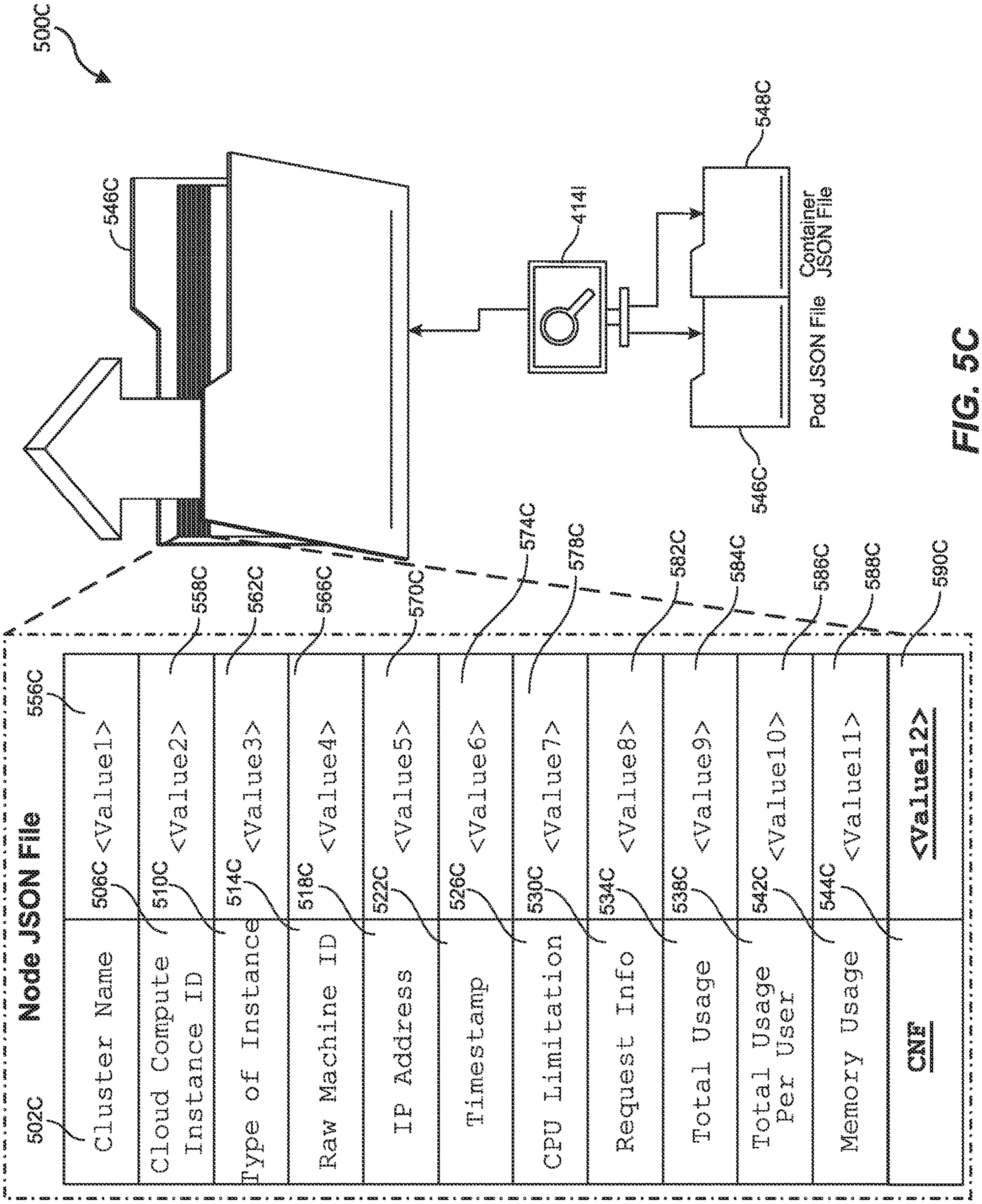
FIG. 5C shows a diagram of a JSON file corresponding to a node within the cluster.

State 514 may refer to a set of some or all numerical data describing the cellular telecommunication network, such as data retrieved from platform-specific monitoring tool 410. The corresponding machine learning model or pattern detection layer 502 can attempt to understand behavioral patterns in terms of at least CPU, memory, and/or network utilization in response to one or more specific actions to be performed by containerized network functions of the cellular telecommunication network core. Generally speaking, the machine learning model can predict one or more effects of one or more actions being performed by the containerized network functions. Accordingly, pattern detection layer 502 may apply policy 512, using the predicted effects as inputs, to thereby generate one or more recommended actions (i.e., corresponding to the selection of the most desirable one of the predicted effects), as shown in diagram 500 using indicator 503. FIGS. 5B-5C provide more detailed examples regarding JSON or other log files corresponding to state 514.

Policy 512 may be configured to specify one or more recommended actions such that the recommended actions are intended to at least partially prevent a network deficiency identified as one of the predictable effects of current or previous behavior by the containerized network functions. As used herein, the term "network deficiency" can generally refer to any suboptimal performance within a network according to a policy or design specifications. In some examples, predicting the network deficiency can include predicting a deviation from a service level agreement beyond a threshold. For example, policy 512 may effectively monitor for predicted future deviations from one or more goals, objectives, and/or specifications of a service level agreement. Upon detecting a predicted future deviation from a goal or other term of the service level agreement, policy 512 may specify a recommended action that is intended to at least partially prevent or remediate the predicted future deviation. Performance of the recommended action corresponding to indicator 503 may result in a new environment 506, which can correspond to an updated version of state 514 (where s indicates the previous state and s' may indicate the new state resulting from the recommended action). Additionally, or alternatively, pattern detection layer 502 may apply one or more evaluation functions to environment 506 to further ascertain whether the change in state 514, in response to the performance of the recommended action corresponding to indicator 503, was preferable or instead not preferred or undesirable. In other words, method 100 may further include, in some examples, evaluating a result of the modification to the file chart generated by the cloud native computing package manager in comparison to a service level agreement between an operator of the cellular telecommunication network core and a user of the cellular telecommunication network.

For example, pattern detection layer 502 may monitor whether the recommended action exacerbated or increased the deviation from the specified goal or other term of the service level agreement. In such cases, pattern detection layer 502 may effectively penalize the recommended action corresponding to indicator 503 within deep neural network 510. Alternatively, as shown, pattern detection layer 502 may apply a reward 502 to the recommended action corresponding to indicator 503 based on the evaluation function indicating that the change in state 514 was preferred or desirable, such as by preventing a deviation from the goal or term of the service level agreement, as further discussed above. In other words, in some examples method 100 may further include penalizing or rewarding, within the deep neural network, the modification to the file chart generated by the cloud native computing package manager based on the evaluated result of the modification to the file chart generated by the cloud native computing package manager.

Illustrative examples of actions corresponding to indicator 503 may include instantiating or spinning up a new cluster within the managed container-orchestration system, instantiating a new instance of a containerized network function within the cellular telecommunication network core, increasing an amount of computational resources available to the network, increasing a number of bytes available for processing by a corresponding containerized network function, and/or any one or more of the illustrative examples of types of network modifications shown in FIG. 4H, as discussed above.

Generally speaking, the neural network 510 may correspond to managed container-orchestration system resource recommender 428 within pattern detection 426 shown in diagram 400 of FIG. 4A. Moreover, managed container-orchestration system resource recommender 428 may implement one or more actions recommended by the neural network 510 at least in part by recommending the insertion, deletion, expansion, reduction, and/or other modification of a corresponding resource on the cellular telecommunication network core. Because the cellular telecommunication network core is implemented using the managed container-orchestration system, and is specified by the file chart generated by cloud native computing package manager 404-1, managed container-orchestration system resource recommender 428 may recommend a particular action at least in part by specifying or indicating corresponding changes to the file chart, such that when the updated file chart is deployed then the cellular communication network core is effectively modified.

In some examples, modifying the file chart generated by the cloud native computing package manager and deploying the modified file chart is performed by the cellular telecommunication network core such that the cellular telecommunication network core is autonomously self-improving. More specifically, in some examples, penalizing or rewarding, within the deep neural network, the modification to the file chart generated by the cloud native computing package manager is performed by the cellular telecommunication network core such that the cellular telecommunication network core is autonomously self-improving.

As shown within diagram 500, pattern detection layer 502 can correspond to open network pattern reactor 402, and both of these can operate in a manner that is autonomously self-improving. For example, pattern detection layer 502 may operate in a manner that forms a closed loop, as shown, such that human intervention is reduced, eliminated, or otherwise rendered unnecessary, including intervention by a DevOps engineer or a network engineer, for example.

As further described above, state 514 may include some or all of the numerical measurements available to the cellular telecommunication network core about its own state and/or behavior. In various examples, the technology of this application may benefit from, or otherwise leverage, one or more platform-specific tools that monitor the operation or behavior of subcomponents within the cloud computing platform on which the cellular telecommunication network core is executing. The platform-specific tools may provide logs in the form of JSON files that describe various attributes and/or behaviors of one or more subcomponents of the cloud computing platform. These logs can provide a rich and comprehensive database of information on which to generate state 514 for pattern detection layer 502. In particular, the logs can provide a higher level of resolution and/or granularity in comparison to off-cloud measurement tools used in related methodologies, as further discussed above.

FIG. 5B shows a diagram 500B of a JSON file 546B corresponding to a cluster. As discussed above, the JSON file may correspond to, or include, the log generated by the platform-specific monitoring tool 414I. File 546B may include multiple different fields specifying different respective values, as shown. In the example of diagram 500B, file 546B may specify a cluster name 502B, a timestamp 504B at which time the file or log was generated, a number of nodes 506B that are included within the corresponding cluster, and an indication 508B of how many different nodes are failing at the time of the timestamp. Additionally, file 546B may also specify a containerized network function 510B, including a type of a containerized network function and/or an instance identifier of a containerized network function, that is executing on the corresponding cluster of the file or log. Diagram 500B also further shows that file 546B may specify particular values 512B-520B for each one of these respective fields. For simplicity and ease of discussion, these values are illustrated as "<value1>", "<value2>", etc., in the example of this diagram.

Similar to FIG. 5B, FIG. 5C shows a diagram 500C of a JSON file 546C corresponding to a node within the cluster. File 546C specifies a cluster name 502C, a cloud compute instance identifier 506C, a type of instance 510C, a raw machine identifier 514C, an Internet protocol address 518C, a timestamp 522C, a CPU limitation 526C, an item of request information 530C, an indication of total usage 534C, an indication of total usage per user 538C, an indication of memory usage 542C, and an identifier of a containerized network fun, for example function 544C. Diagram 500C also illustrates how file 546C may further specify spending values for each one of these respective fields, as shown in the form of values 556C-590C. Diagram 500C also shows how platform-specific monitoring tool 414I may generate not just file 546C corresponding to a node, but may also generate essentially parallel information including the corresponding fields and respective values for different layers, resources, and/or entities within the cloud computing platform, including a pod JSON file 546C and container JSON file 548C. In the examples of these figures, the file is formatted according to the JSON format but those having skill in the art can recognize that this file format is merely illustrative and, in other examples, a similarly suitable or substitutable file format may be used. Although not necessarily shown within the figures, one or more of these types of values or fields may also be included within file 546B.

Containerized network function 510B and containerized network function 544C may correspond to labels 440H-450H, as further discussed above. In other words, in some examples, the various logs generated by the platform-specific monitoring tool may not include the identification of the containerized network function that a particular resource of the cloud computing platform, such as a node or a cluster, is executing, is assigned to, or is contributing to. The platform-specific monitoring tool may not necessarily possess this information for one or more reasons, including potentially the cloud computing platform not necessarily having visibility into or comprehension of the specific software processes being implemented by the customer or carrier administering the cellular telecommunication network. Accordingly, at a high level, this application discloses the inventive insight that such granular, robust, comprehensive, and/or high-frequency logs of information, which can indicate useful items of data such as computational usage, memory usage, network transactions, and/or errors, can be matched or correlated with the containerized network functions that are triggering or resulting in these results or effects within the cloud computing platform. For these reasons, in some examples, the logs can be labeled with the instance identifier and/or type of the containerized network function, and this labeled data can be used as training data for the machine learning model, according to supervised machine learning. In this manner, the machine learning model can thereby develop an understanding of the correlation between the actions that containerized network functions performed, on the one hand, and resource consumption or network effects on the other hand. This correlation can form a primary or fundamental correlation on which the machine learning model is built. Nevertheless, in further examples, this primary correlation can form the foundation for higher order or more complicated correlations to be ascertained by the machine learning model, including correlations between candidate network modifications, such as candidate modifications 414H-422H, and scores for formulas or heuristics directed to satisfying service-level agreements while minimizing cost, as further discussed above.

The cellular service carrier can perform the labeling because the cellular service carrier may possess this information (i.e., information indicating which particular containerized network function is executing at or is assigned to a particular resource within the cloud computing platform) as the customer or user of the cloud computing platform. In contrast, the platform-specific monitoring tool, as part of the cloud computing platform, may not necessarily possess this information readily and/or may not automatically include this information within the corresponding logs. Accordingly, this application discloses an inventive methodology whereby the information identifying the containerized network function can be inserted or labeled onto these logs to train a machine learning model and/or to form inputs into a previously-trained machine learning model.

Figure 6:
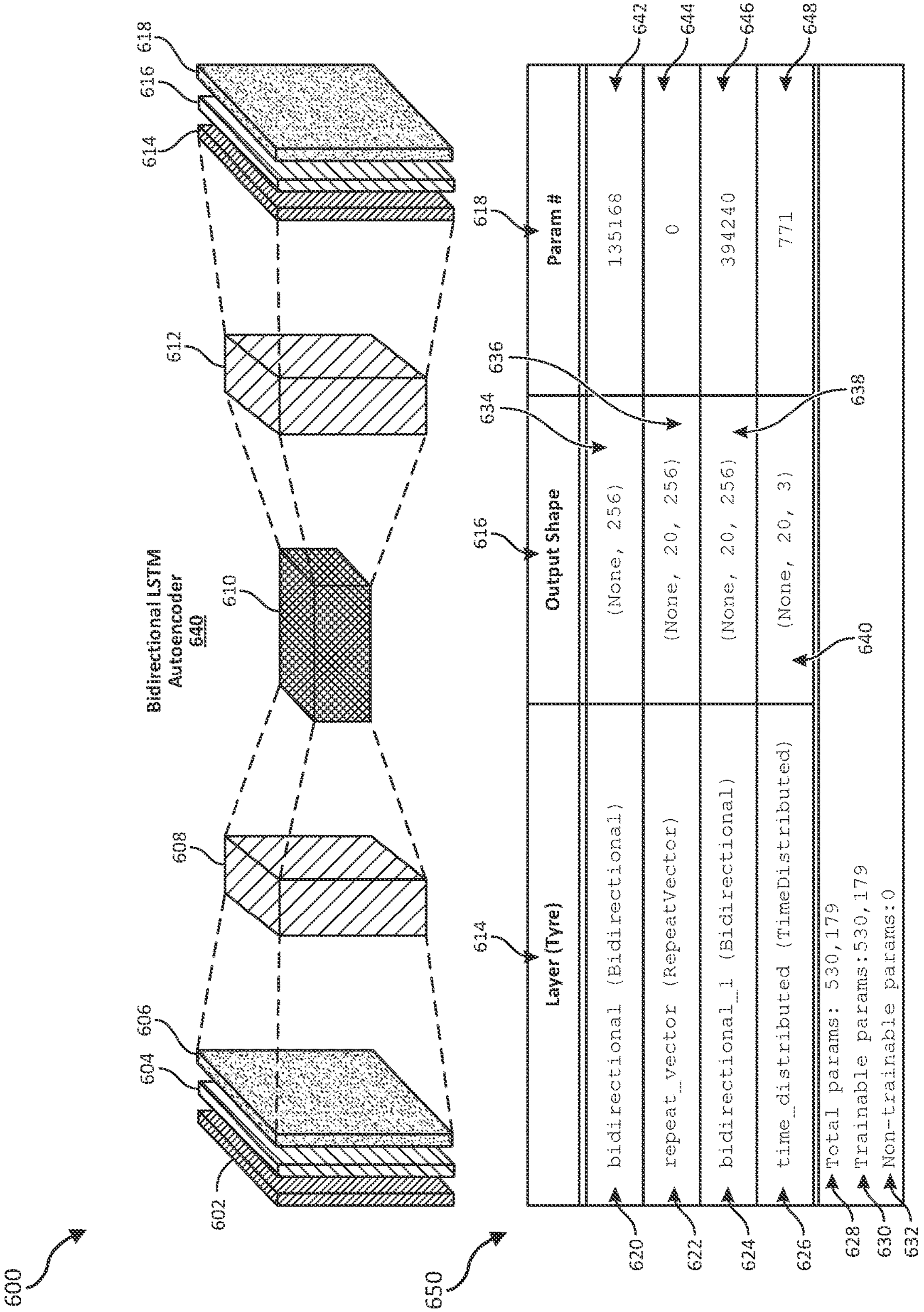
FIG. 6 shows a bidirectional long short-term memory network as a form of a recurrent neural network that may be used in the context of a cellular telecommunication network core.

FIG. 6 shows a diagram 600 of bidirectional long short-term memory autoencoder 640 as a form of a recurrent neural network that may be used in the context of a cellular telecommunication network core. Bidirectional long short-term memory autoencoder 640 may include deep neural network layers 602-618, as shown. FIG. 6 also shows a table 650 that specifies different items of information relating to bidirectional long short-term memory autoencoder 640. These items of information are specified in columns 614-618 and row 620-632. Column 614 specifies which particular layer is being described, column 616 describes an output shape corresponding to the particular layer, and column 618 specifies a number of parameters being configured according to bidirectional long short-term memory autoencoder 640. Cells 634-638 and 642-648 specify particular values corresponding to each respective intersection of a particular row and a particular column, as shown. Row 628 further indicates that the total number of parameters being tuned is 530,179, the number of trainable parameters is also 530,179, and the number of non-trainable parameters is zero accordingly. Those having skill in the art will ascertain that the example of bidirectional long short-term memory autoencoder 640 is merely illustrative and, in other examples, other versions of deep neural networks, recurrent neural networks, and/or other machine learning methodologies may be used to achieve one or more of the benefits of performing method 100.

The example of diagram 600 indicates a single model, corresponding to long short-term memory autoencoder 640, but in additional or alternative examples multiple models may be used. In such examples, the multiple models may be communicatively interconnected such that they can share inferences and/or other information, with the goal of minimizing a number of penalties inflicted upon a particular recommended action or recommended modification to the cellular telecommunication network core.

Figure 7:
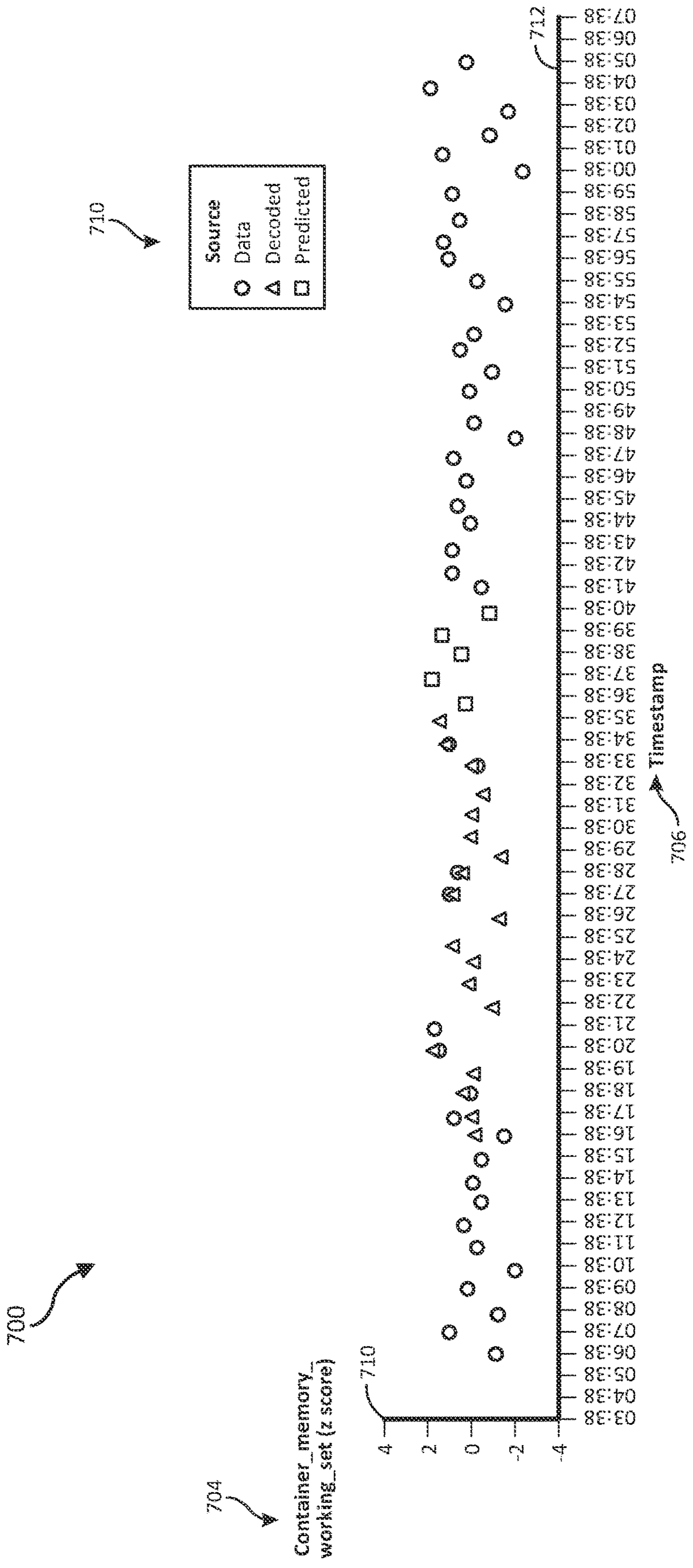
FIG. 7 shows a chart indicating the timing of Z scores with respect to actual data, decoded data, and predicted data.

FIG. 7 shows a diagram 700 indicating the timing of Z scores with respect to actual data, decoded data, and predicted data, consistent with a legend 710. Diagram 700 further includes a vertical axis 704, which shows that the vertical axis of diagram 700 corresponds to a Z score relating to container memory. Similarly, diagram 700 further includes a horizontal axis 706, which shows that the horizontal axis of diagram 700 corresponds to incremental timestamps along a chronological time span.

As further shown within FIG. 7, the various instances of the triangle icon corresponding to decoded data begin at approximately the 16 minute mark and conclude at approximately the 36 minute mark. Accordingly, these different instances of the triangle icon indicate that the machine learning model, such as a deep neural network or bidirectional long short-term memory autoencoder or other recurrent neural network, was learning across this span of time. Moreover, the instances of the square icon correspond to predicted data points. Diagram 700 further shows how the machine learning was generating predicted data points from approximately the 36 minute mark to the 40 minute mark.

In the context of the deep neural network or bidirectional long short-term memory autoencoder described above, one goal would be to minimize the differences between the predicted values, which correspond to the instances of the square icons, on the one hand, and a remaining type of value charted within diagram 700, either the actual data points corresponding to the circle icons and/or the decoded data points corresponding to the triangle icons. When the difference between these two sets of data points is sufficiently minimized according to a policy or threshold comparison, then this may trigger or initiate the deep neural network to recommend the corresponding specific action or modification to the cellular telecommunication network core.

Figure 8:
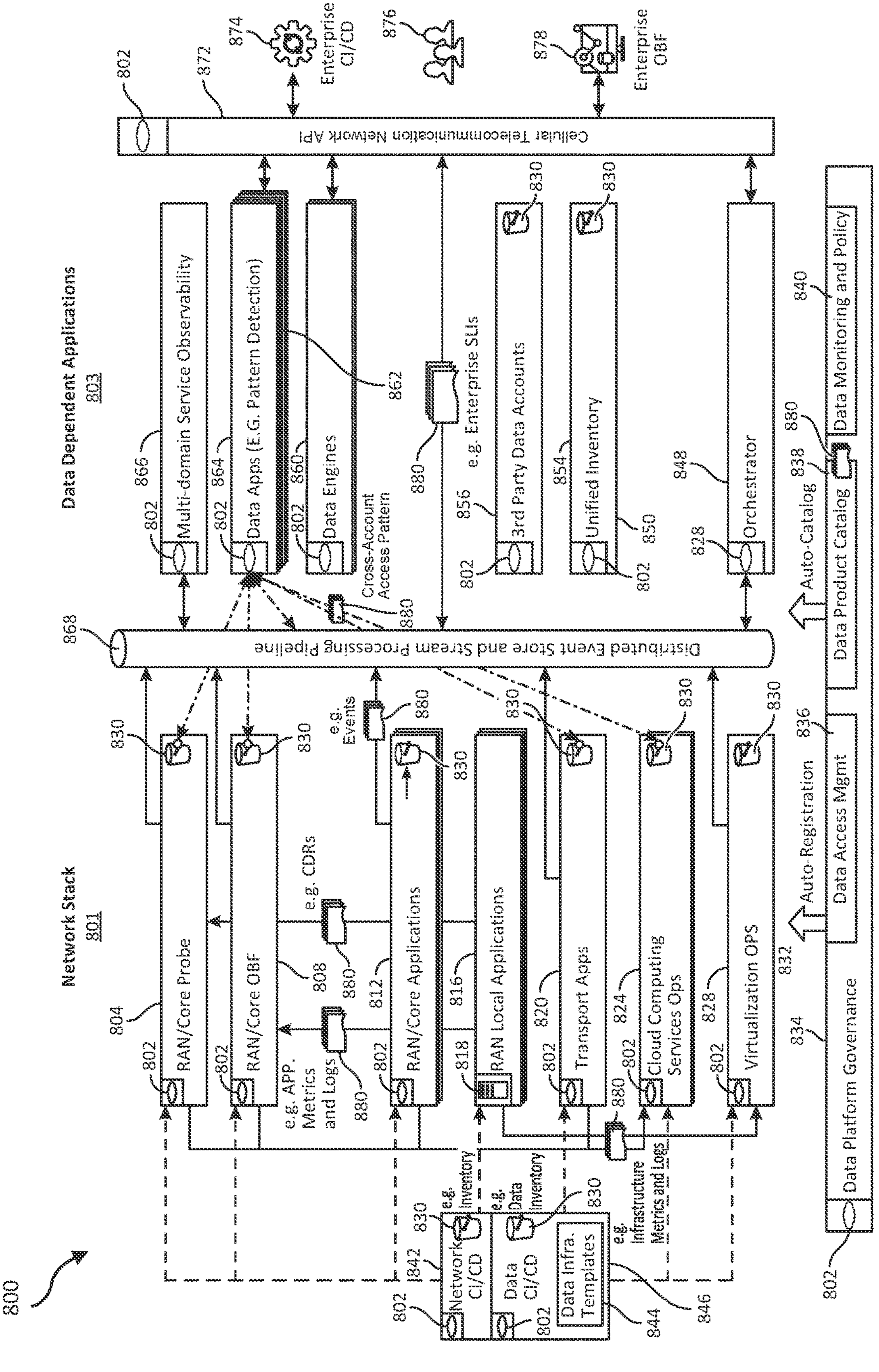
FIG. 8 shows a diagram of a pipeline configuration between a network stack and a plurality of data dependent applications, including an application directed to pattern detection.

FIG. 8 shows a diagram 800 of a pipeline configuration between a network stack and a plurality of data dependent applications, including an application directed to pattern detection. As further shown within diagram 800, a network stack 801 may interact or communicate with data dependent applications 803 across a distributed event store and stream processing platform 868, which can be directed to or configured for internal communications by the cellular telecommunication network core administered by a cellular service carrier, as discussed above. One illustrative example of such a distributed event store and stream processing platform may include an instance of Apache Kafka. A more particular example may include Confluent Kafka. As shown, data dependent applications 803 may include multi-domain service observability applications 866, data applications 864, which can further include pattern detection 426, data engines 860, third party data accounts 856, a unified inventory 854, and/or an orchestrator 848.

With respect to method 100 and/or the machine learning models described above in connection with FIGS. 4A and 5A, diagram 800 illustrates how data applications 864, including the machine learning model corresponding to pattern detection, can ingest data from each one of the applications included within network stack 801. For example, data applications 864 may ingest events 880 from radio access network core applications 812. Data applications 864 may also ingest cross-account access pattern information 880, as shown. Moreover, radio access network core applications 812 may provide application metrics and logs 880 to radio access network core observability framework 802, which may thereby provide them to data applications 864. Similarly, radio access network core applications 812 may provide call data records 880 to radio access network core probe 804. Network stack 801 may include a radio access network core probe for cloud-native automated service assurance component 804, a radio access network core observability framework component 808, a radio access network core set of applications 812, a radio access network set of local applications 816, transport applications 820, cloud computing service operations 824, and/or virtualization operations 828.

Diagram 800 also illustrates how a multitude of different applications within the network stack 801 and data dependent applications 803 are implemented within a cloud computing platform, as indicated by the different instances of a cloud computing platform indicator 802. In contrast, a local server indicator 818 highlights to the reader that radio access network local applications 816 may be implemented locally rather than in the cloud.

As further discussed above, network stack 801 and data dependent applications 803 may be configured according to a continuous integration and continuous delivery (CI/CD) pipeline, including network CI/CD 842 and data CI/CD 844. Network CI/CD 842 and data CI/CD 844 may store data within a corresponding cloud storage bucket indicated by different instances of cloud storage bucket 830. Data CI/CD 844 may further include data infrastructure templates 846. Diagram 800 also further indicates how network CI/CD 842 provides generic network information regarding inventory, whereas data CI/CD 844 provides data inventory information, including infrastructure metrics and logs 880.

Diagram 800 further includes, at the bottom, a data platform governance component 834, which further includes a data access management component 836, a data product catalog 838, and the data monitoring and policy component 840. Data access management component 836 may perform auto-registration procedures, whereas data product catalog 838 may generate a catalog 880 automatically, as shown.

On the right-hand side, diagram 800 may further illustrate how data dependent applications 803 interact with a cellular telecommunication network API 872, which provides an interface with an enterprise CI/CD component 874, end-users 876, and/or an enterprise observability framework 878, as shown. Cellular telecommunication network API 872 may also ingest enterprise service level indicators 880 from distributed event store and stream processing pipeline 868.

Figure 9:
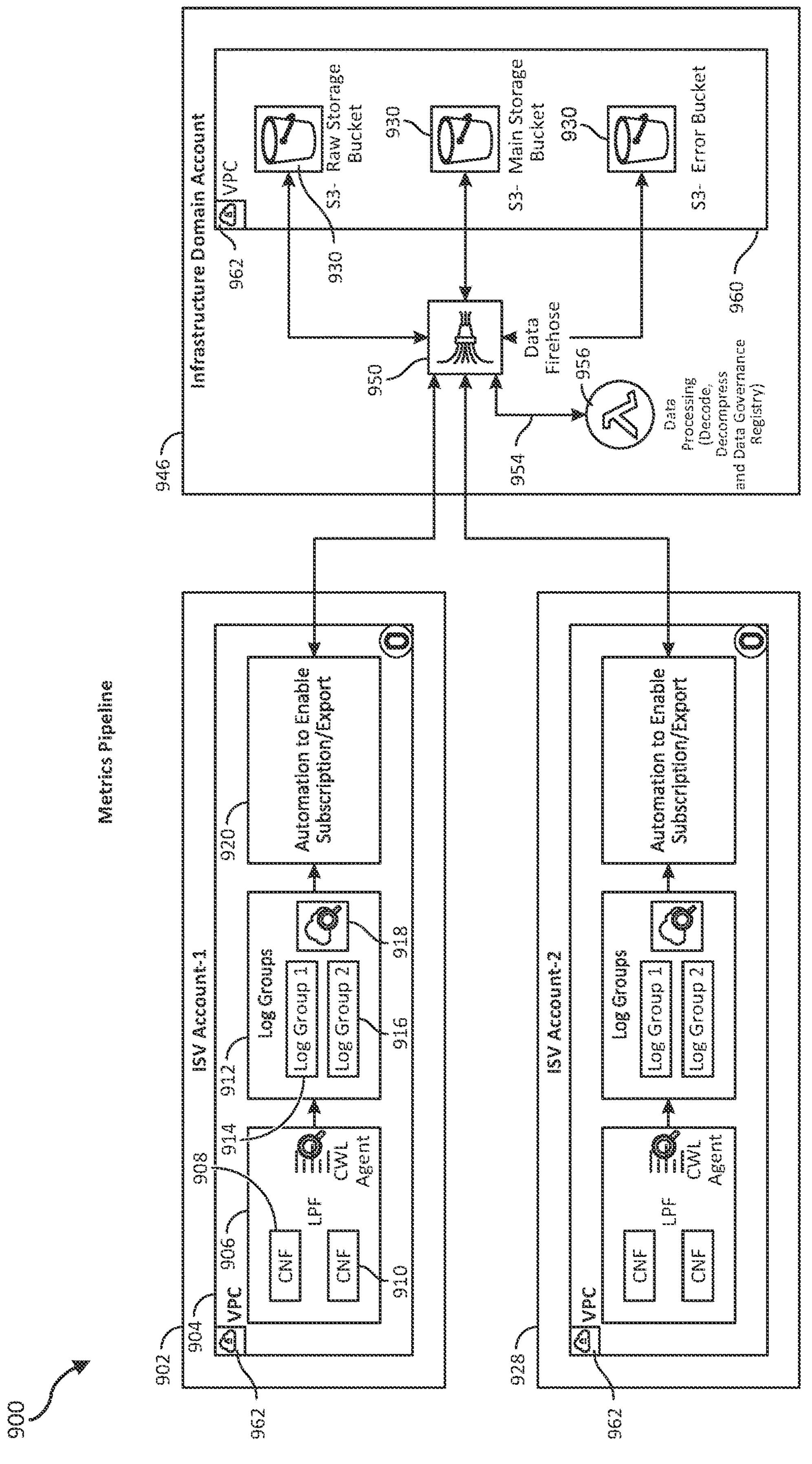
FIG. 9 shows a diagram of a managed container-orchestration system metrics pipeline.

FIG. 9 shows a diagram 900 of a managed container-orchestration system metrics pipeline. Diagram 900 shows how an independent software vendor account 902 and an independent software vendor account 928 may both interface with an infrastructure domain account 946. Similar to FIG. 8, diagram 900 uses multiple instances of an indicator 962 to highlight to the reader where components are implemented within the cloud computing platform. Independent software vendor account 902 may further include an instance of a virtual public cloud 904, which may further include a component 906, a component 912, and a component 920. Component 906 may include or interact with a containerized network function 908 and a containerized network function 910. These containerized network functions may be monitored by a log processing and forwarding tool, such as Fluent Bit, which can forward the corresponding logs to component 912. Component 912 may maintain multiple log groups, including a log group 914 and a log group 916. Component 912 may correspond to a platform-specific monitoring tool, such as CloudWatch, as further discussed above. Component 920 may enable automation to subscriber export logs and/or log information through the platform-specific monitoring tool. Independent software vendor account 928 may operate in a manner that is essentially parallel to the operation of independent software vendor account 902, as shown, such that multiple different independent software vendor accounts interface with infrastructure domain account 946.

Infrastructure domain account 946 may ingest data from the independent software vendor accounts by utilizing a data firehose 950, which is configured to handle a massive amount of streaming data. One illustrative example of data firehose 950 may include Kinesis. The ingested data may be processed by a component 956, such as Lambda, to provide decoding, decompression, and/or data governance registry processing (e.g., Kafka Schema processing). Infrastructure domain account 946 may also maintain a virtual public cloud 962, including three instances of a storage bucket corresponding to raw data storage, main data storage, and error data storage, as shown.

Figure 10:
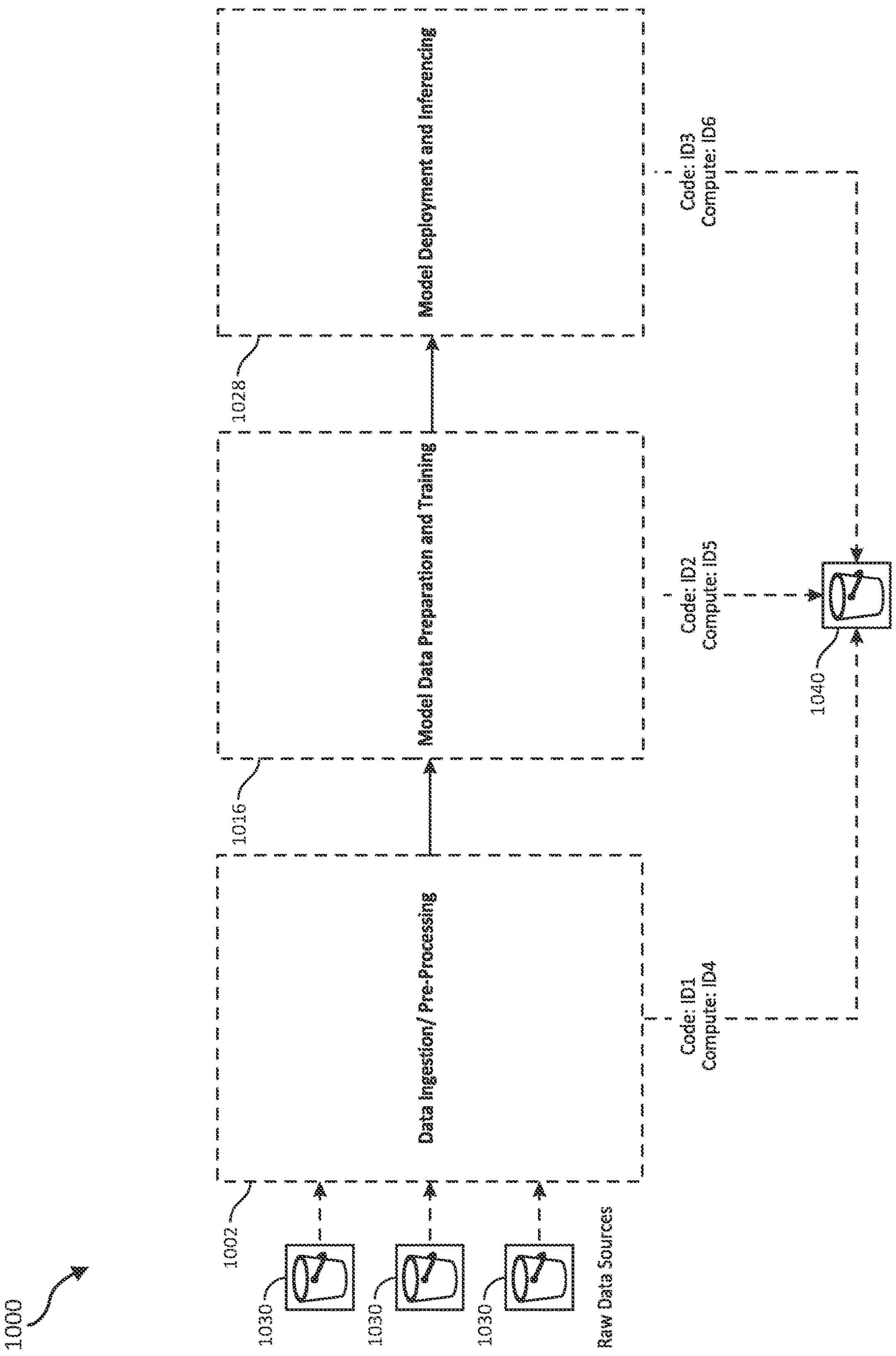
FIG. 10 shows a diagram indicating a workflow between a data ingestion and pre-processing stage, a model data preparation and training stage, and a model deployment and inferencing stage.

FIG. 10 shows a diagram 1000 indicating a workflow between a data ingestion and pre-processing stage, a model data preparation and training stage, and a model deployment and inferencing stage. As further shown within this figure, multiple instances of a raw data source bucket 1030 may be input into a data ingestion/pre-processing stage 1002. Subsequently, the workflow corresponding to diagram 1000 may proceed to a model data preparation and training stage 1016. Lastly, the workflow corresponding to diagram 1000 may proceed to a model deployment and inferencing stage 1028.

In the bottom, diagram 1000 also further indicates how each one of the different three stages of the workflow may use a different brand, product, and/or solution for computing code and for computational power, respectively. These are indicated by respective and different identifiers, ID1-ID6. After model deployment and inferencing stage 1028, data may be stored as output within an open storage bucket 1040.

Figure 11:
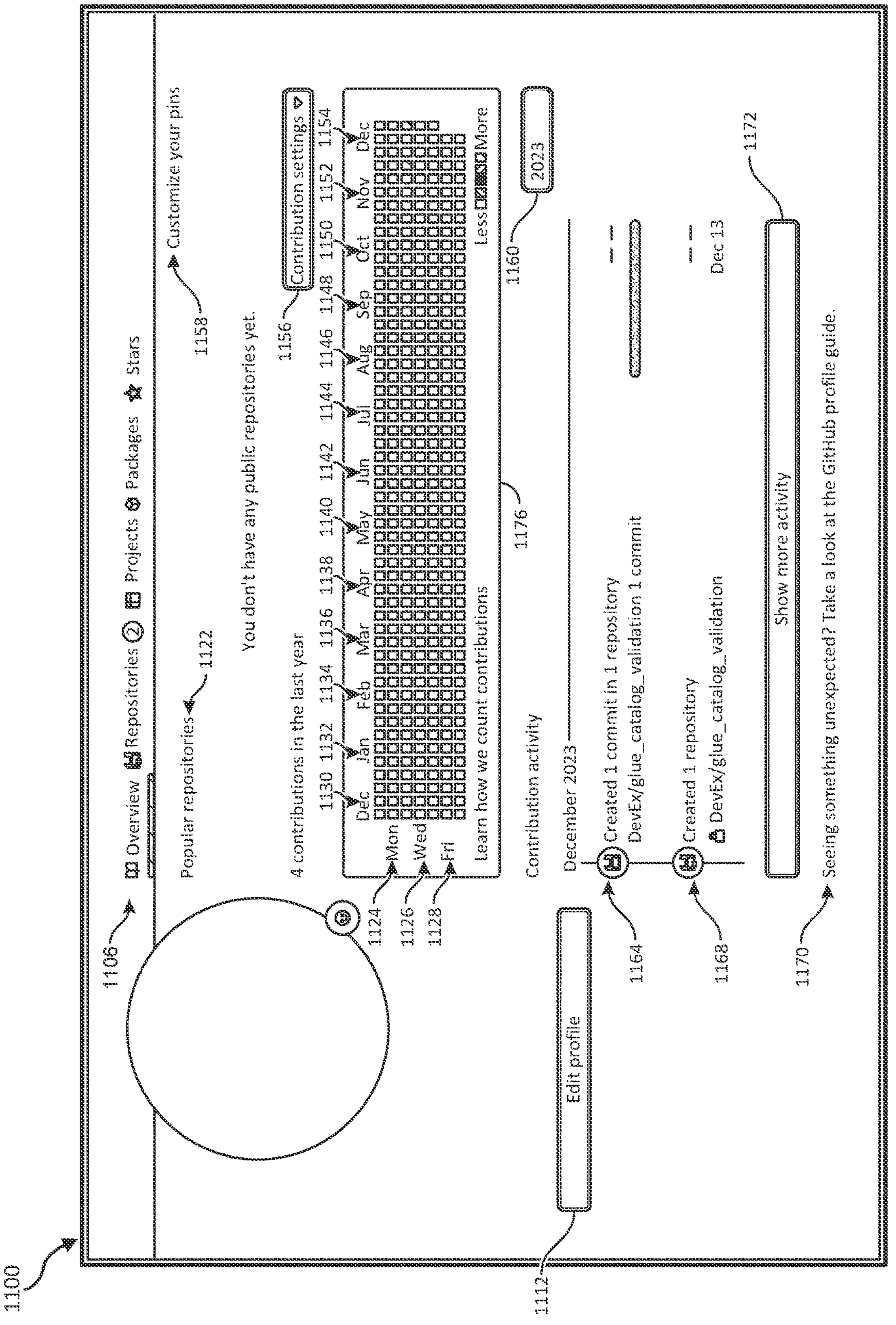
FIG. 11 shows an example graphical user interface for a dashboard corresponding to a software development kit that can generate software for performing one or more of the methods described herein.

FIG. 11 shows a diagram 1100 for a graphical user interface enabling an end-user to interact with a software development kit that can generate software for performing method 100 and/or can otherwise facilitate the performance of method 100, as discussed in more detail below. Diagram 1100 may include a list 1106 of headings that enable the end-user to interact with an overview page, a repository page, a project page, a packages page, and/or a star/favorites page, as shown. An indicator 1122 can point out to the end-user repositories that are particularly popular. Similarly, an indicator 1158 may guide the end-user to an interface for customizing one or more graphical user interface pins. Columns 1130-1154 and rows 1124-1128 can form a calendar that provides a graphical indication of when contributions have been made to the corresponding repository. A graphical user interface element 1156 may form a drop-down menu that enables the end-user to modify or toggle one or more contribution settings. A graphical user interface element 1160 enables the user to select or toggle between different calendar years. Similarly, a graphical user interface element 1112 enables an end-user to edit a corresponding user profile. An indicator 1164 and indicator 1168 may form part of the newsfeed that provides chronological updates to the end-user regarding contributions to the repository. A button or graphical user interface element 1172 may enable the user to show more activity along the corresponding newsfeed. Lastly, an indicator 1170 notifies the end-user that, if the end-user notices something that is unexpected, then the user may be directed to a corresponding profile guide regarding the repository.

Figure 12:
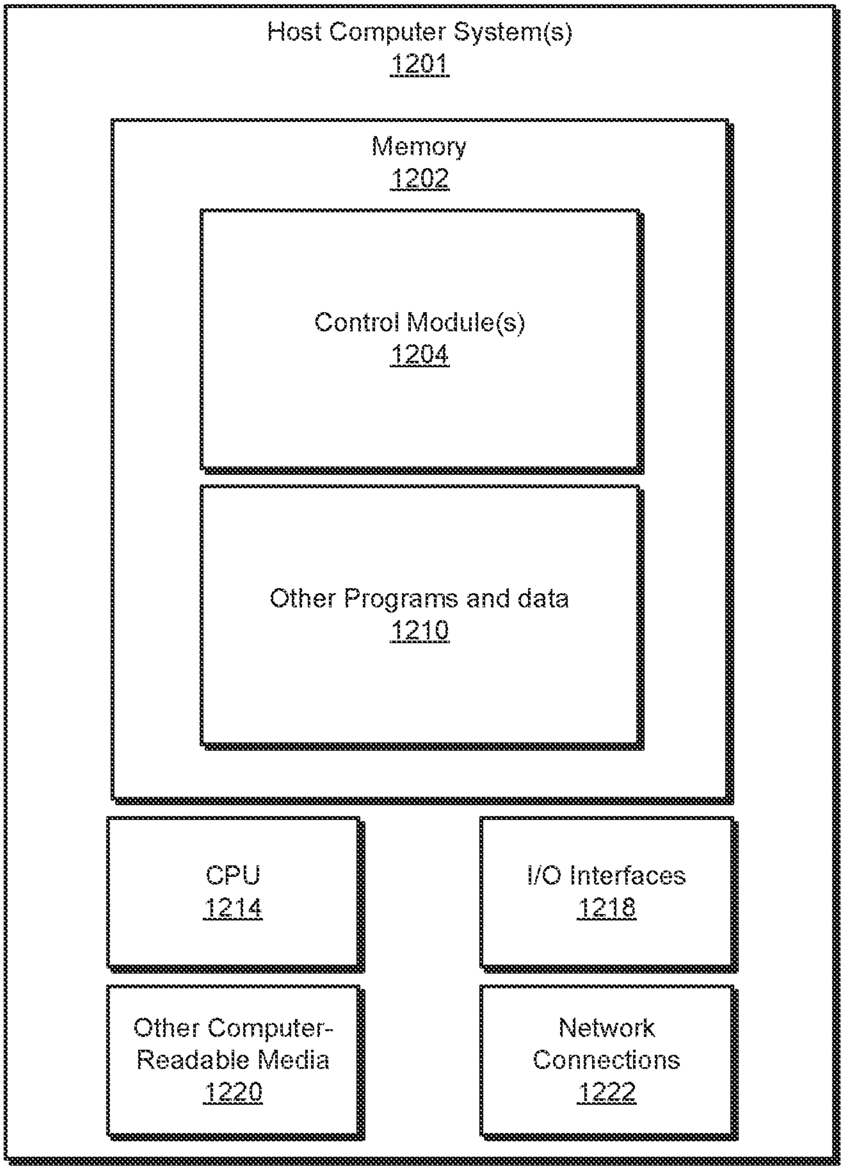
FIG. 12 shows a diagram of an example computing system that may facilitate the performance of one or more of the methods described herein.

FIG. 12 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 12 illustrates an example of underlying hardware on which such software and functionality may be hosted and/or implemented.

In particular, shown is example host computer system(s) 1201. For example, such computer system(s) 1201 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1201 may include memory 1202, one or more central processing units (CPUs) 1214, I/O interfaces 1218, other computer-readable media 1220, and network connections 1222.

Memory 1202 may include one or more various types of non-volatile and/or volatile storage technologies. Examples of memory 1202 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1202 may be utilized to store information, including computer-readable instructions that are utilized by CPU 1214 to perform actions, including those of embodiments described herein.

Memory 1202 may have stored thereon control module(s) 1204. The control module(s) 1204 may be configured to implement and/or perform some or all of the functions of the systems or components described herein. Memory 1202 may also store other programs and data 1210, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1222 are configured to communicate with other computing devices to facilitate the functionality described herein. In various embodiments, the network connections 1222 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1218 may include a video interface, other data input or output interfaces, or the like. Other computer-readable media 1220 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

predicting a network deficiency by applying a machine learning model trained on a log from a monitoring tool that monitors a resource within a cloud computing platform on which is executing at least part of a cellular telecommunication network core that is configured within a managed container-orchestration system as specified by a file chart generated by a cloud native computing package manager; and modifying how the cellular telecommunication network core is configured within the managed container-orchestration system such that the predicted network deficiency is at least partially prevented by modifying the file chart according to a recommendation of the machine learning model and deploying the modified file chart;

wherein the machine learning model is configured to predict, as output, a future state of the cellular telecommunication network core based on a candidate modification to the cellular telecommunication network core.

2. The method of claim 1, wherein the machine learning model was generated by:

labeling the log from the monitoring tool with a containerized network function of the cellular telecommunication network that is executing on the resource within the cloud computing platform; and training the machine learning model on the log labeled with the containerized network function.

3. The method of claim 1, wherein the machine learning model generates the recommendation by:

generating, as outputs, a set of multiple predicted states of the cellular telecommunication network core based on a set of respective candidate modifications to the cellular telecommunication network core; and selecting, as the recommendation, a specific candidate modification from the set of respective candidate modifications that maximizes a function that is directed to maximizing price performance in terms of satisfying a service level agreement between a carrier of the cellular telecommunication network core and an end-user.

4. The method of claim 1, wherein the candidate modification to the cellular telecommunication network core comprises at least one of:

a null action of maintaining a current condition of the cellular telecommunication network core;

elastically sizing up or down an instance or a number of instances of the resource in the cloud computing platform;

relocating a containerized network function toward or away from an edge of the cloud computing platform;

switching a version of the containerized network function; or switching a source or brand of the containerized network function.

5. The method of claim 1, wherein modifying the file chart generated by the cloud native computing package manager and deploying the modified file chart is performed by the cellular telecommunication network core such that the cellular telecommunication network core is autonomously self-improving.

6. The method of claim 1, wherein:

the machine learning model comprises a deep neural network that recommends cellular telecommunication network core modifications to be performed through the managed container-orchestration system; and the method further comprises inputting, into the deep neural network, a root cause extracted through a root cause analysis.

7. The method of claim 6, further comprising outputting, by the deep neural network, a specific cellular telecommunication network core modification that at least partially prevents the predicted network deficiency by performing a modification to the file chart generated by the cloud native computing package manager and deploying the modified file chart.

8. The method of claim 7, further comprising evaluating a result of the modification to the file chart generated by the cloud native computing package manager in comparison to a service level agreement between an operator of the cellular telecommunication network core and a user of the cellular telecommunication network.

9. The method of claim 8, wherein penalizing or rewarding, within the deep neural network, the modification to the file chart generated by the cloud native computing package manager is performed by the cellular telecommunication network core such that the cellular telecommunication network core is autonomously self-improving.

10. The method of claim 7, further comprising penalizing or rewarding, within the deep neural network, the modification to the file chart generated by the cloud native computing package manager.

11. The method of claim 6, wherein the deep neural network is configured such that the deep neural network labels states of the cellular telecommunication network core with recommended cellular telecommunication network core modifications.

12. The method of claim 6, wherein the deep neural network comprises:

a deep q-network; or a bidirectional long short-term memory autoencoder.

13. The method of claim 12, wherein:

the method is performed by a data dependent application; and the data dependent application inputs data from a network stack across a distributed event store and stream processing platform within a data center.

14. The method of claim 13, wherein the distributed event store and stream processing platform inputs data from at least three of the following components of the network stack:

a radio access network core probe for cloud-native automated service assurance component;

a radio access network core observability framework component;

a cloud computing services operations component; and a virtualization operations component.

15. The method of claim 6, wherein a respective instance of the deep neural network is disposed in a majority of each cluster of the managed container-orchestration system on which the cellular telecommunication network core operates.

16. A system comprising:

at least one physical computing processor of a computing device; and a non-transitory computer-readable medium encoding instructions that, when executed by the at least one physical computing processor, cause the computing device to perform operations including:

predicting a network deficiency by applying a machine learning model trained on a log from a monitoring tool that monitors a resource within a cloud computing platform on which is executing at least part of a cellular telecommunication network core that is configured within a managed container-orchestration system as specified by a file chart generated by a cloud native computing package manager; and modifying how the cellular telecommunication network core is configured within the managed container-orchestration system such that the predicted network deficiency is at least partially prevented by modifying the file chart according to a recommendation of the machine learning model and deploying the modified file chart;

wherein the machine learning model is configured to predict, as output, a future state of the cellular telecommunication network core based on a candidate modification to the cellular telecommunication network core.

17. A method comprising:

providing a software development kit, wherein the software development kit is configured such that the software development kit generates software that performs operations including:

predicting a network deficiency by applying a machine learning model trained on a log from a monitoring tool that monitors a resource within a cloud computing platform on which is executing at least part of a cellular telecommunication network core that is configured within a managed container-orchestration system as specified by a file chart generated by a cloud native computing package manager; and modifying how the cellular telecommunication network core is configured within the managed container-orchestration system such that the predicted network deficiency is at least partially prevented by modifying the file chart according to a recommendation of the machine learning model and deploying the modified file chart;

wherein the machine learning model is configured to predict, as output, a future state of the cellular telecommunication network core based on a candidate modification to the cellular telecommunication network core.

18. The method of claim 17, wherein the software development kit comprises a plug-and-play component that interfaces with the cloud native computing package manager in a manner that is agnostic between different brands of cloud native computing package manager.

19. The method of claim 17, wherein:

the software development kit is configured such that deploying the modified file chart is performed through a managed container-orchestration system facilitator application; and the software development kit comprises a plug-and-play component that interfaces with the managed container-orchestration system facilitator application in a manner that is agnostic between different brands of managed container-orchestration system deployment facilitator applications.

20. The method of claim 17, wherein the software development kit comprises a plug-and-play component that interfaces with the managed container-orchestration system in a manner that is agnostic between different brands of managed container-orchestration systems.

* * * * *